(12) United States Patent
Sabbavarapu et al.

(10) Patent No.: US 12,526,745 B2
(45) Date of Patent: Jan. 13, 2026

(54) POWER SAVING FOR CONNECTED DEVICES

(71) Applicant: QUALCOMM Incorporated, San Diego, CA (US)

(72) Inventors: Jaya Venku Naidu Sabbavarapu, Hyderabad (IN); Jayapal Aruri, Hyderabad (IN); Nigam Mohan Palo, Hyderabad (IN); Sagar Kotte, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 18/316,695

(22) Filed: May 12, 2023

(65) Prior Publication Data

US 2024/0381258 A1 Nov. 14, 2024

(51) Int. Cl.
*H04W 52/02* (2009.01)
*H04W 68/02* (2009.01)

(52) U.S. Cl.
CPC ....... *H04W 52/0232* (2013.01); *H04W 68/02* (2013.01)

(58) Field of Classification Search
None
See application file for complete search history.

(56) References Cited

U.S. PATENT DOCUMENTS

| | | | |
|---|---|---|---|
| 9,119,173 B1* | 8/2015 | Krishnamoorthy | ... H04W 68/02 |
| 2009/0219844 A1 | 9/2009 | Soliman | |
| 2018/0368101 A1 | 12/2018 | Agiwal et al. | |
| 2022/0417903 A1 | 12/2022 | Liu | |
| 2024/0187988 A1* | 6/2024 | Maleki | ............. H04W 52/0216 |

OTHER PUBLICATIONS

International Search Report and Written Opinion—PCT/US2024/024737—ISA/EPO—Jul. 12, 2024.

* cited by examiner

*Primary Examiner* — Walter J Divito
(74) *Attorney, Agent, or Firm* — Harrity & Harrity, LLP

(57) ABSTRACT

Various aspects of the present disclosure generally relate to wireless communication. In some aspects, a device may pair with a user equipment (UE) via a short-range wireless communication protocol. The device may refrain, while operating in an idle or inactive mode, from activating a cellular modem to monitor one or more paging occasions of an idle mode discontinuous reception (IDRX) paging cycle. The device may monitor, while operating in the idle or inactive mode, one or more monitoring occasions associated with the short-range wireless communication protocol. The device may receive, from the UE and via the short-range wireless communication protocol, IDRX paging information in a monitoring occasion of the one or more monitoring occasions associated with the short-range wireless communication protocol. Numerous other aspects are described.

30 Claims, 15 Drawing Sheets

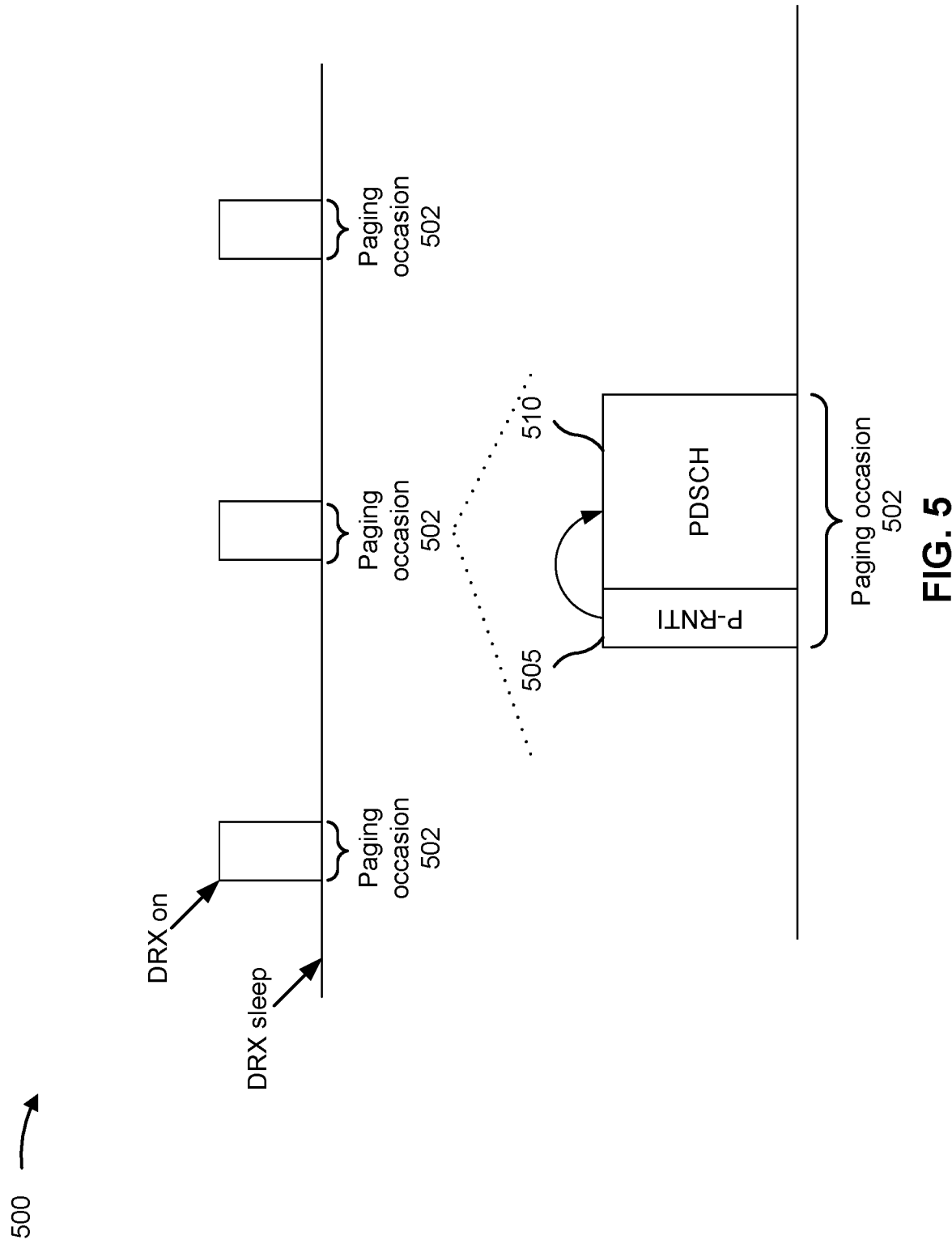

POWER SAVING FOR CONNECTED DEVICES

FIELD OF THE DISCLOSURE

Aspects of the present disclosure generally relate to wireless communication and to techniques and apparatuses for power saving for connected devices.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a device for wireless communication. The device may include a memory and one or more processors coupled to the memory. The one or more processors may be configured to pair with a user equipment (UE) via a short-range wireless communication protocol. The one or more processors may be configured to refrain, while operating in an idle or inactive mode, from activating a cellular modem to monitor one or more paging occasions of an idle mode discontinuous reception (IDRX) paging cycle. The one or more processors may be configured to monitor, while operating in the idle or inactive mode, one or more monitoring occasions associated with the short-range wireless communication protocol. The one or more processors may be configured to receive, from the UE and via the short-range wireless communication protocol, IDRX paging information in a monitoring occasion of the one or more monitoring occasions associated with the short-range wireless communication protocol.

Some aspects described herein relate to a UE for wireless communication. The UE may include a memory and one or more processors coupled to the memory. The one or more processors may be configured to pair with a connected device via a short-range wireless communication protocol. The one or more processors may be configured to monitor, while operating in an idle or inactive mode, one or more paging occasions of an IDRX paging cycle. The one or more processors may be configured to receive, from a network node, IDRX paging information in a paging occasion of the one or more paging occasions of the IDRX paging cycle. The one or more processors may be configured to transmit, to the connected device and via the short-range wireless communication protocol, the IDRX paging information in a monitoring occasion of one or more monitoring occasions associated with the short-range wireless communication protocol.

Some aspects described herein relate to a method of wireless communication performed by a device. The method may include pairing with a UE via a short-range wireless communication protocol. The method may include refraining, while operating in an idle or inactive mode, from activating a cellular modem to monitor one or more paging occasions of an IDRX paging cycle. The method may include monitoring, while operating in the idle or inactive mode, one or more monitoring occasions associated with the short-range wireless communication protocol. The method may include receiving, from the UE and via the short-range wireless communication protocol, IDRX paging information in a monitoring occasion of the one or more monitoring occasions associated with the short-range wireless communication protocol.

Some aspects described herein relate to a method of wireless communication performed by a UE. The method may include pairing with a connected device via a short-range wireless communication protocol. The method may include monitoring, while operating in an idle or inactive mode, one or more paging occasions of an IDRX paging cycle. The method may include receiving, from a network node, IDRX paging information in a paging occasion of the one or more paging occasions of the IDRX paging cycle. The method may include transmitting, to the connected device and via the short-range wireless communication protocol, the IDRX paging information in a monitoring occasion of one or more monitoring occasions associated with the short-range wireless communication protocol.

Some aspects described herein relate to a non-transitory computer-readable medium that stores a set of instructions for wireless communication by a device. The set of instructions, when executed by one or more processors of the device, may cause the device to pair with a UE via a short-range wireless communication protocol. The set of instructions, when executed by one or more processors of the device, may cause the device to refrain, while operating in an idle or inactive mode, from activating a cellular modem to monitor one or more paging occasions of an IDRX paging cycle. The set of instructions, when executed by one or more processors of the device, may cause the device to monitor, while operating in the idle or inactive mode, one or more monitoring occasions associated with the short-range wireless communication protocol. The set of instructions, when executed by one or more processors of the device, may cause the device to receive, from the UE and via the short-range wireless communication protocol, IDRX paging information in a monitoring occasion of the one or more monitoring occasions associated with the short-range wireless communication protocol.

Some aspects described herein relate to a non-transitory computer-readable medium that stores a set of instructions for wireless communication by a UE. The set of instructions, when executed by one or more processors of the UE, may cause the UE to pair with a connected device via a short-range wireless communication protocol. The set of instructions, when executed by one or more processors of the UE, may cause the UE to monitor, while operating in an idle or inactive mode, one or more paging occasions of an IDRX paging cycle. The set of instructions, when executed by one or more processors of the UE, may cause the UE to receive, from a network node, IDRX paging information in a paging occasion of the one or more paging occasions of the IDRX paging cycle. The set of instructions, when executed by one or more processors of the UE, may cause the UE to transmit, to the connected device and via the short-range wireless communication protocol, the IDRX paging information in a monitoring occasion of one or more monitoring occasions associated with the short-range wireless communication protocol.

Some aspects described herein relate to an apparatus for wireless communication. The apparatus may include means for pairing with a UE via a short-range wireless communication protocol. The apparatus may include means for refraining, while operating in an idle or inactive mode, from activating a cellular modem to monitor one or more paging occasions of an IDRX paging cycle. The apparatus may include means for monitoring, while operating in the idle or inactive mode, one or more monitoring occasions associated with the short-range wireless communication protocol. The apparatus may include means for receiving, from the UE and via the short-range wireless communication protocol, IDRX paging information in a monitoring occasion of the one or more monitoring occasions associated with the short-range wireless communication protocol.

Some aspects described herein relate to an apparatus for wireless communication. The apparatus may include means for pairing with a connected device via a short-range wireless communication protocol. The apparatus may include means for monitoring, while operating in an idle or inactive mode, one or more paging occasions of an IDRX paging cycle. The apparatus may include means for receiving, from a network node, IDRX paging information in a paging occasion of the one or more paging occasions of the IDRX paging cycle. The apparatus may include means for transmitting, to the connected device and via the short-range wireless communication protocol, the IDRX paging information in a monitoring occasion of one or more monitoring occasions associated with the short-range wireless communication protocol.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of an idle mode discontinuous reception (IDRX) paging cycle, in accordance with the present disclosure.

DETAILED DESCRIPTION

Figure 1:
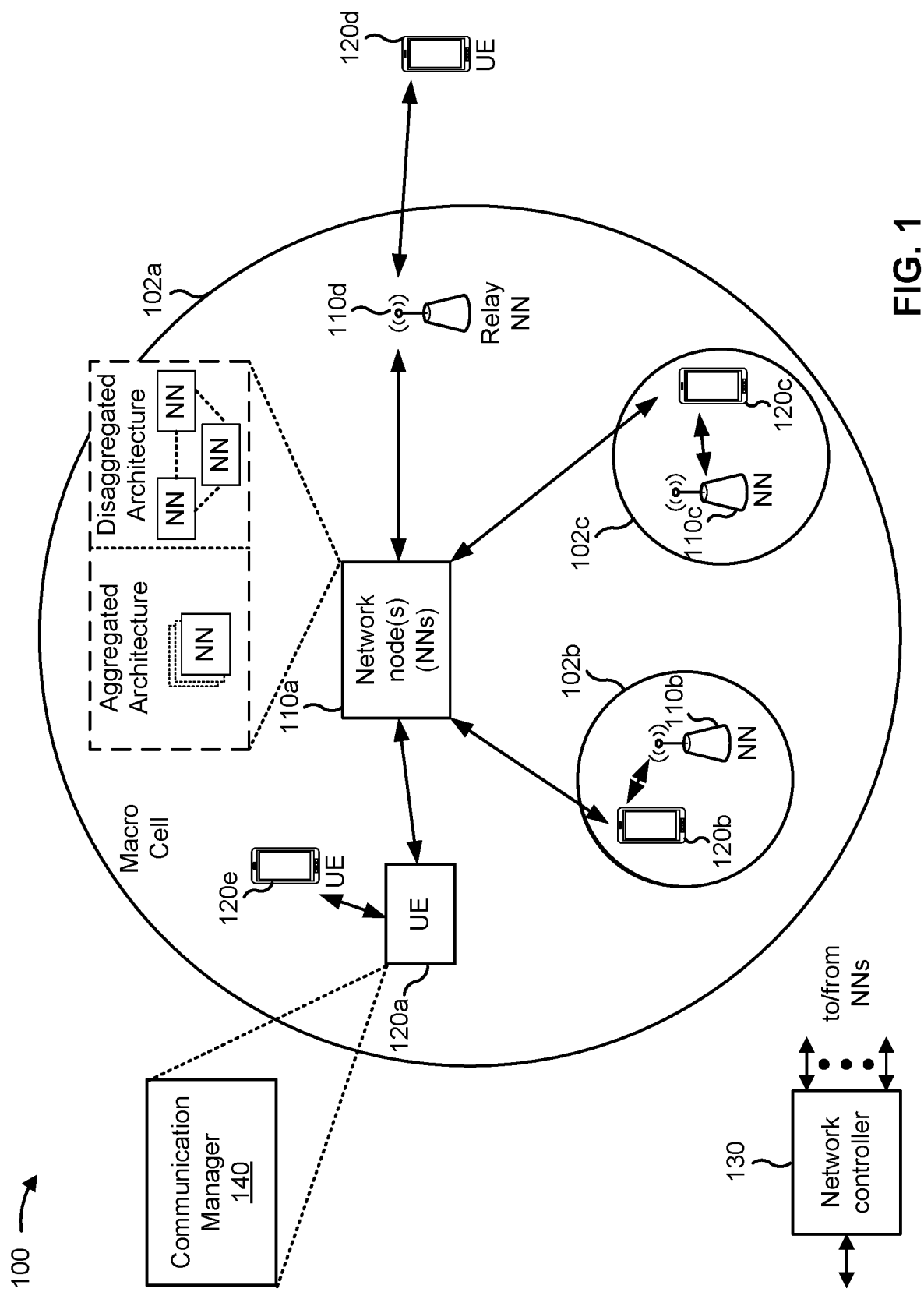
FIG. 1 is a diagram illustrating an example of a wireless network, in accordance with the present disclosure.

Connected devices, such as wearable devices, may have small battery sizes. For example, a smart watch battery may support up to 500-600 milliamp hours (mAh). Accordingly, power optimization is an important factor for wearable devices and/or other connected devices. A connected device may communicate using different communication modes. For example, a connected device may communicate with a companion user equipment (UE) using a short-range wireless communication protocol (e.g., Bluetooth) and the connected device may communicate with a network node using a cellular modem. Such different communication modes may be associated with different levels of power consumption for a connected device. For example, communications using the cellular modem may consume more power than communications via the short-range wireless communication protocol (e.g., Bluetooth). In a case in which a connected device and a companion UE paired with the connected device are in an idle or inactive mode, the connected device and the UE may both monitor paging occasions of an idle mode discontinuous reception (IDRX) paging cycle. In this case, the paging messages received by the connected device and the UE may carry the same information, but both the connected device and the UE activate their respective cellular modems to monitor for the paging messages. Such repeated cellular activity at the connected device may consume power and result in decreased battery life for the connected device.

Some techniques and apparatuses described herein enable a connected device to avoid monitoring paging occasions of an IDRX paging cycle in parallel with a companion UE. In some aspects, a connected device may pair with a UE via a short-range wireless communication protocol. The connected device, while operating in an idle or an inactive mode, may refrain from activating a cellular modem to monitor paging occasions of an IDRX paging cycle. The connected device, while operating in the idle or inactive mode, may monitor monitoring occasions associated with the short-range wireless communication protocol. The UE may monitor the paging occasions associated with the wireless communication protocol, and the UE may receive paging information in a paging occasion. The connected device may receive, from the UE and via the short-range wireless communication protocol, the paging information in a monitoring occasion associated with the short-range wireless communication protocol. As a result, the cellular modem of the connected device may remain in a sleep state instead of being activated to monitor paging occasions of an IDRX paging cycle. In this way, the power consumption of the connected device may be reduced, and the battery life of the connected device may be increased.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node

110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may pair with another UE via a short-range wireless communication protocol; refrain, while operating in an idle or inactive mode, from activating a cellular modem to monitor one or more paging occasions of an IDRX paging cycle; monitor, while operating in the idle or inactive mode, one or more monitoring occasions associated with the short-range wireless communication protocol; and receive, from the other UE and via the short-range wireless communication protocol, IDRX paging information in a monitoring occasion of the one or more monitoring occasions associated with the short-range wireless communication protocol.

In some aspects, as described in more detail elsewhere herein, the communication manager 140 may pair with a connected device (e.g., another UE) via a short-range wireless communication protocol; monitor, while operating in an idle or inactive mode, one or more paging occasions of an IDRX paging cycle; receive, from a network node, IDRX paging information in a paging occasion of the one or more paging occasions of the IDRX paging cycle; and transmit, to the connected device and via the short-range wireless communication protocol, the IDRX paging information in a monitoring occasion of one or more monitoring occasions associated with the short-range wireless communication protocol. Additionally, or alternatively, the communication manager 140 may perform one or more other operations described herein.

As indicated above, FIG. 1 is provided as an example. Other examples may differ from what is described with regard to FIG. 1.

Figure 2:
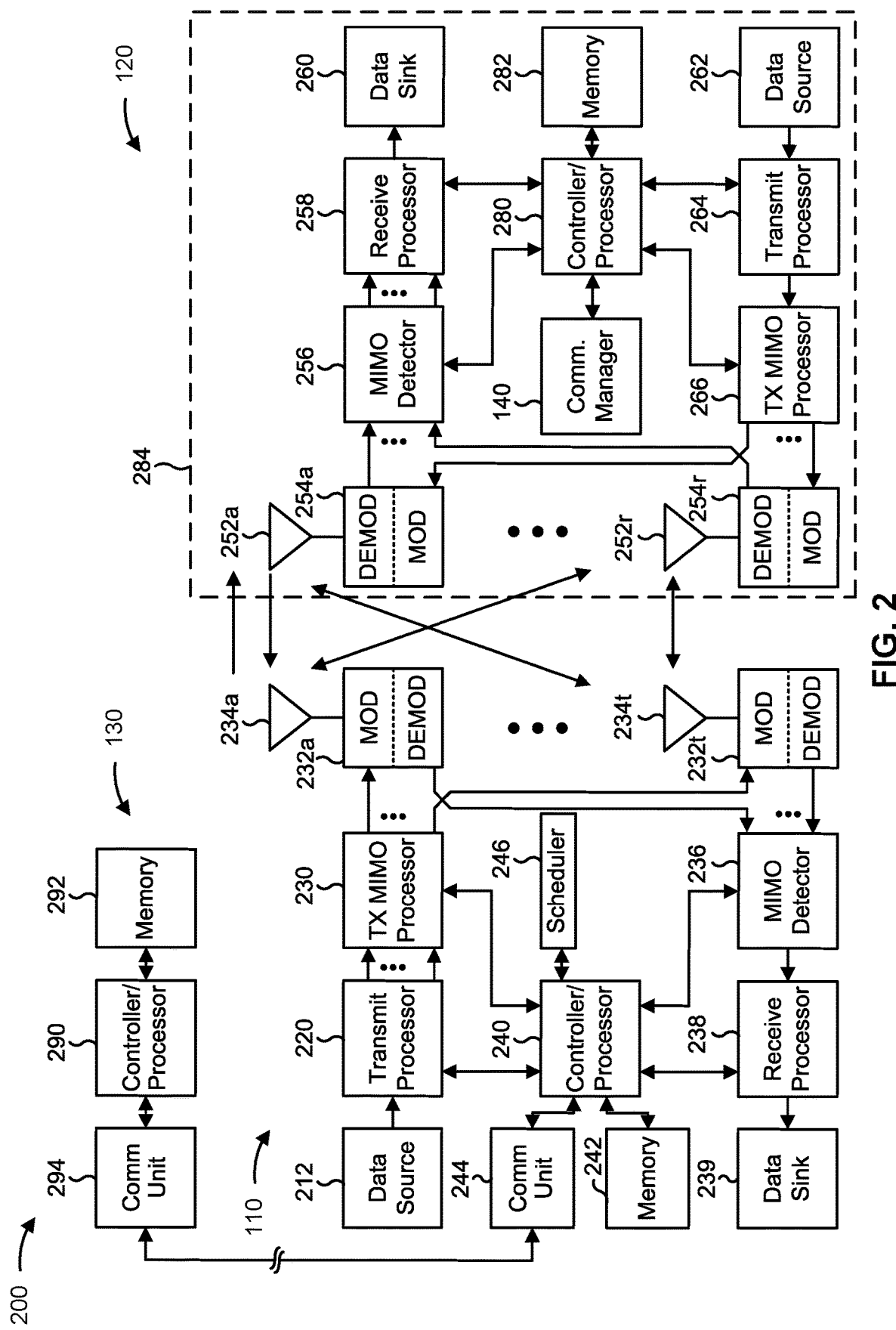
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-6B, 7, 8A-8B, and 9-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-6B, 7, 8A-8B, and 9-13).

The controller/processor 240 of the network node 110, the controller/processor 280 of the UE 120, and/or any other component(s) of FIG. 2 may perform one or more techniques associated with power saving for connected devices, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples. In some aspects, the device or connected device described herein is the UE 120, is included in the UE 120, or includes one or more components of the UE 120 shown in FIG. 2.

In some aspects, a device (e.g., the UE 120) includes means for pairing with a UE via a short-range wireless communication protocol; means for refraining, while operating in an idle or inactive mode, from activating a cellular modem to monitor one or more paging occasions of an IDRX paging cycle; means for monitoring, while operating in the idle or inactive mode, one or more monitoring occasions associated with the short-range wireless communication protocol; and/or means for receiving, from the UE and via the short-range wireless communication protocol, IDRX paging information in a monitoring occasion of the one or more monitoring occasions associated with the short-range wireless communication protocol. In some aspects, the means for the device to perform operations described herein may include, for example, one or more of communication manager 140, antenna 252, modem 254, MIMO detector 256, receive processor 258, transmit processor 264, TX MIMO processor 266, controller/processor 280, memory 282, or short-range wireless communication transceiver 405 discussed in connection with FIG. 4.

In some aspects, a UE (e.g., the UE 120) includes means for pairing with a connected device via a short-range wireless communication protocol; means for monitoring, while operating in an idle or inactive mode, one or more paging occasions of an IDRX paging cycle; means for receiving, from a network node, IDRX paging information in a paging occasion of the one or more paging occasions of the IDRX paging cycle; and/or means for transmitting, to the connected device and via the short-range wireless communication protocol, the IDRX paging information in a monitoring occasion of one or more monitoring occasions associated with the short-range wireless communication protocol. The means for the UE to perform operations described herein may include, for example, one or more of communication manager 140, antenna 252, modem 254, MIMO detector 256, receive processor 258, transmit processor 264, TX MIMO processor 266, controller/processor 280, memory 282 or short-range wireless communication transceiver 405 discussed in connection with FIG. 4.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
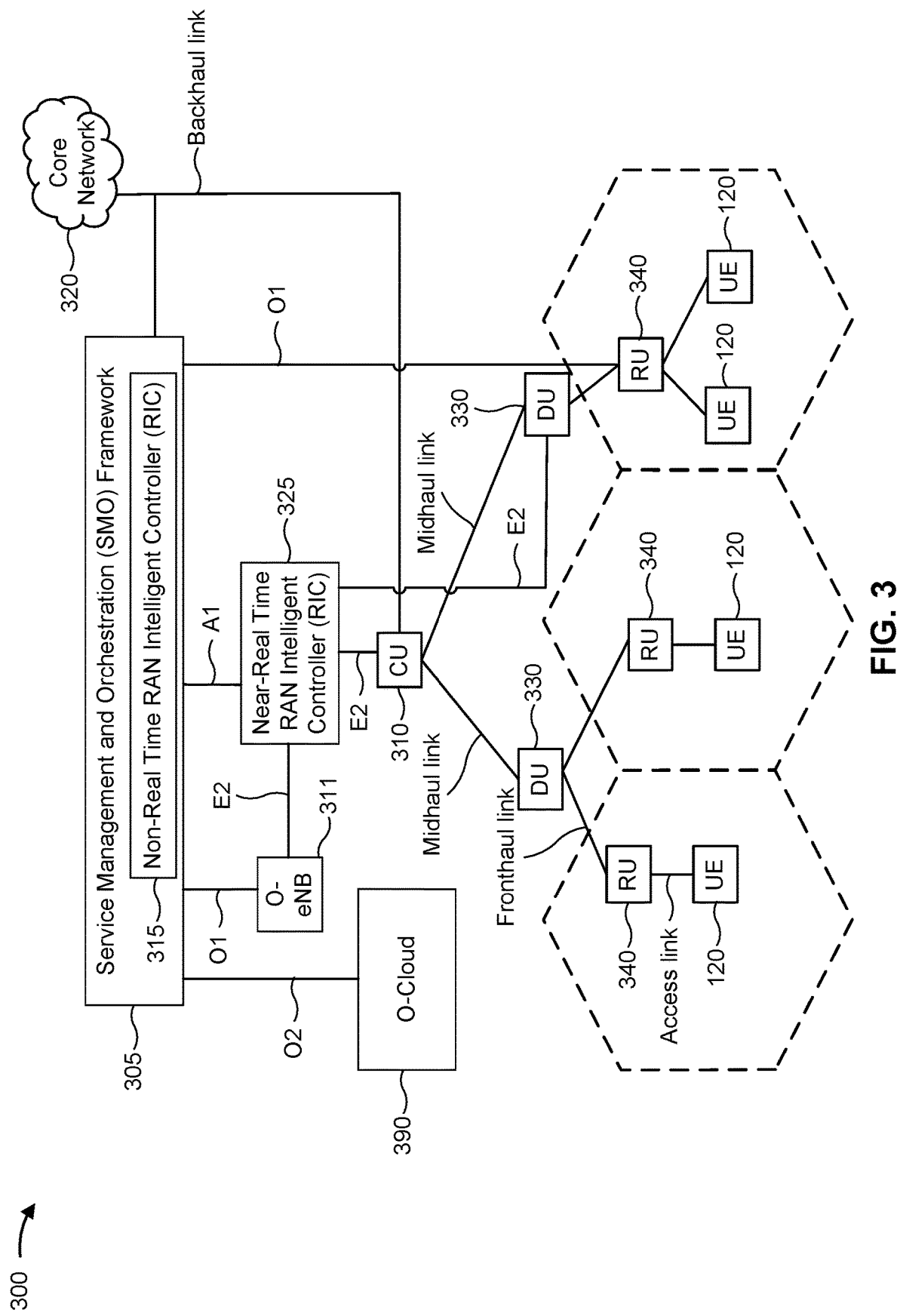
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
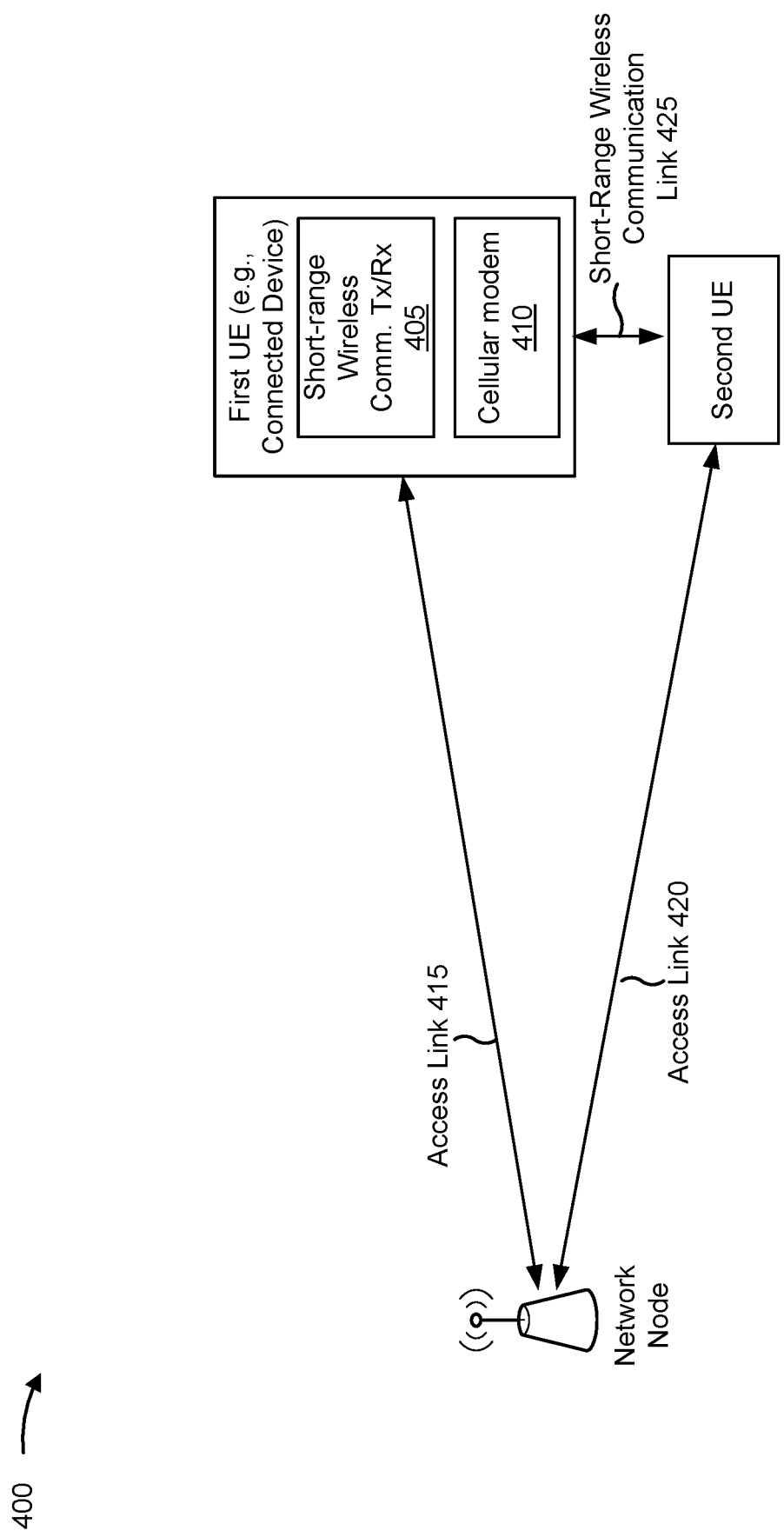
FIG. 4 is a diagram illustrating an example of connected device communications, in accordance with the present disclosure.

FIG. 4 is a diagram illustrating an example 400 of connected device communications, in accordance with the present disclosure. As shown in FIG. 4, example 400 includes communication between a first UE, a second UE, and a network node. The first UE may be connected device. As used herein, "connected device" may refer to a UE that can connect or pair with another UE via a short-range wireless communication protocol. For example, a connected device may be a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a medical device, or a biometric device, among other examples. As shown in FIG. 4, the first UE (e.g., the connected device) may include a short-range wireless communication transceiver 405 and a cellular modem 410 (e.g., a 5G modem), such as modem 254 discussed in connection with FIG. 2. The short-range wireless communication transceiver 405 may transmit and receive communications using a short-range wireless communication protocol. "Short-range wireless communication protocol" may refer to a communication protocol associated with a short-range wireless network technology (e.g., for wirelessly interconnected devices via a personal area network (PAN)), such as Bluetooth, Bluetooth low energy (BLE), Zigbee, an infrared data association (IrDA) communication protocol, or wireless universal serial bus (USB), among other examples. Bluetooth, for example, is a packet-based protocol with a master/slave architecture, in which a master device may pair with and communicate with one or more slave devices. In some examples, the short-range wireless communication transceiver 405 may be a Bluetooth transceiver. In some examples, the short-range wireless communication transceiver 405 may include a short-range wireless communication receiver and a short-range wireless communication transmitter.

The first UE (e.g., the connected device), using the cellular modem 410, may communicate with the network node (e.g., network node 110) via a first access link 415. The second UE may also communicate with the network node via a second access link 420 (e.g., using a cellular modem of the second UE). The first UE (e.g., the connected device), using the short-range wireless communication transceiver 405, may communicate with the second UE (e.g., a UE 120) via a short-range wireless communication link 425 using the short-range wireless communication protocol (e.g., Bluetooth or another short-range wireless communication protocol). Accordingly, the second UE may also include a short-range wireless communication transceiver (e.g., including a short-range wireless communication receiver and a short-range wireless communication transmitter) for receiving and transmitting communications using a short-range wireless communication protocol.

In some examples, the first UE and the second UE may be associated with the same user. For example, the first UE (e.g., the connected device) may be a wearable device (e.g., a smartwatch or other wearable device) worn by the user, and the second UE may be a cellular phone (e.g., a smart phone) associated with the user. The first UE (e.g., the connected device) and the second UE may pair (e.g., establish a connection) via the short-range wireless communication protocol to enable the first UE and the second UE to communicate using the short-range wireless communication protocol. For example, the second UE may detect that the first UE is within a range of the second UE and pair with the first UE via Bluetooth to enable Bluetooth communication between the first UE and the second UE. In some examples, the second UE may be a Bluetooth master device and the first UE (e.g., the connected device) may be a Bluetooth slave device.

As indicated above, FIG. 4 is provided as an example. Other examples may differ from what is described with respect to FIG. 4.

FIG. 5 is a diagram illustrating an example 500 of an IDRX paging cycle, in accordance with the present disclosure. In some examples, a UE (e.g., a UE 120) may be configured with an IDRX paging cycle. "IDRX paging cycle" may refer to a discontinuous reception (DRX) paging cycle that is used by a UE while the UE is operating in an idle mode/state (e.g., an RRC idle mode) or an inactive mode/state (e.g., an RRC inactive mode). As shown in FIG. 5, the IDRX paging cycle may define paging occasions 502 to be monitored by the UE while the UE is operating in the RRC idle or inactive mode. In some examples, the paging occasions 502 may be periodic, with a periodicity configured via paging cycle configuration information received by the UE from a network node. For example, the paging cycle configuration information may be included in a system information block (SIB) received from the network node. When the UE is in the RRC idle or inactive mode, the network node may page the UE with paging messages in the paging occasions 502 to inform the UE that there is an incoming connection request, a system information update, or a short message. The IDRX paging cycle includes DRX on durations, corresponding to the paging occasions 502, in which the UE is configured to be in an active state (e.g., the cellular modem of the UE is active) to monitor for paging messages. The UE (e.g., the cellular modem of the UE) may enter a DRX sleep state between the paging occasions 502. The time during which the UE 120 is configured to be in an active state during a DRX on duration may be referred to as an active time, and the time during which the UE 120 is configured to be in the DRX sleep state may be referred to as an inactive time.

As shown in FIG. 5, downlink control information (DCI) 505 with a cyclic redundancy check (CRC) scrambled by a paging radio network temporary identifier (P-RNTI) may be used to schedule a paging message 510 in a paging occasion. The paging message 510 may be physical downlink shared channel (PDSCH) communication. The DCI 505 may be included in a physical downlink control channel (PDCCH) communication, which may be referred to as a "paging PDCCH" or a "paging indication." In some examples, the DCI 505 may be group common DCI transmitted to multiple UEs.

The UE, in a paging occasion 502, may monitor a PDCCH for DCI 505. If the UE does not detect/receive DCI in the paging occasion 502, the UE may return to the DRX sleep state. If the UE detects/receives DCI 505 in the paging occasion, the UE may decode the DCI 505. If the decoded DCI 505 is a P-RNTI DCI (e.g., DCI with CRC scrambled by P-RNTI), the UE may further decode the scheduled PDSCH paging message 510 and search for a UE identifier (UE-ID) associated with the UE in the decoded paging message 510 to determine whether the UE is paged. In some examples, if the UE is paged, the UE may remain in the active state, and the UE may communicate with the network node to establish a connection with the network node (e.g., to switch to an RRC connected mode). If the UE is not paged (or if the decoded DCI 505 is not a P-RNTI DCI), the UE may return to the DRX sleep state.

As indicated above, FIG. 5 is provided as an example. Other examples may differ from what is described with respect to FIG. 5.

Connected devices, such as wearable devices, may have small battery sizes. For example, a smart watch battery may support up to 500-600 mAh. Accordingly, power optimization is an important factor for wearable devices and/or other connected devices. A connected device may communicate using different communication modes. For example, a connected device may communicate with a companion UE using a short-range wireless communication protocol (e.g., Bluetooth) and the connected device may communicate with a network node using a cellular modem. Such different communication modes may be associated with different levels of power consumption for a connected device. For example, communications using the cellular modem may consume more power than communications via the short-range wireless communication protocol (e.g., Bluetooth). In a case in which a connected device and a companion UE paired with the connected device are in an idle or inactive mode, the connected device and the UE may both monitor paging occasions of an IDRX paging cycle. In this case, the paging messages received by the connected device and the UE may carry the same information, but both the connected device and the UE activate their respective cellular modems to monitor for the paging messages. Such repeated cellular activity at the connected device may consume power and result in decreased battery life for the connected device.

Some techniques and apparatuses described herein enable a connected device to avoid monitoring paging occasions of an IDRX paging cycle in parallel with a companion UE. In some aspects, a connected device may pair with a UE via a short-range wireless communication protocol. The connected device, while operating in an idle or an inactive mode, may refrain from activating a cellular modem to monitor paging occasions of an IDRX paging cycle. The connected device, while operating in the idle or inactive mode, may monitor monitoring occasions associated with the short-range wireless communication protocol. The UE may monitor the paging occasions associated with the wireless communication protocol, and the UE may receive paging information in a paging occasion. The connected device may receive, from the UE and via the short-range wireless communication protocol, the paging information in a monitoring occasion associated with the short-range wireless communication protocol. As a result, the cellular modem of the connected device may remain in a sleep state instead of being activated to monitor paging occasions of an IDRX paging cycle. In this way, the power consumption of the connected device may be reduced, and the battery life of the connected device may be increased.

Figure 6A:
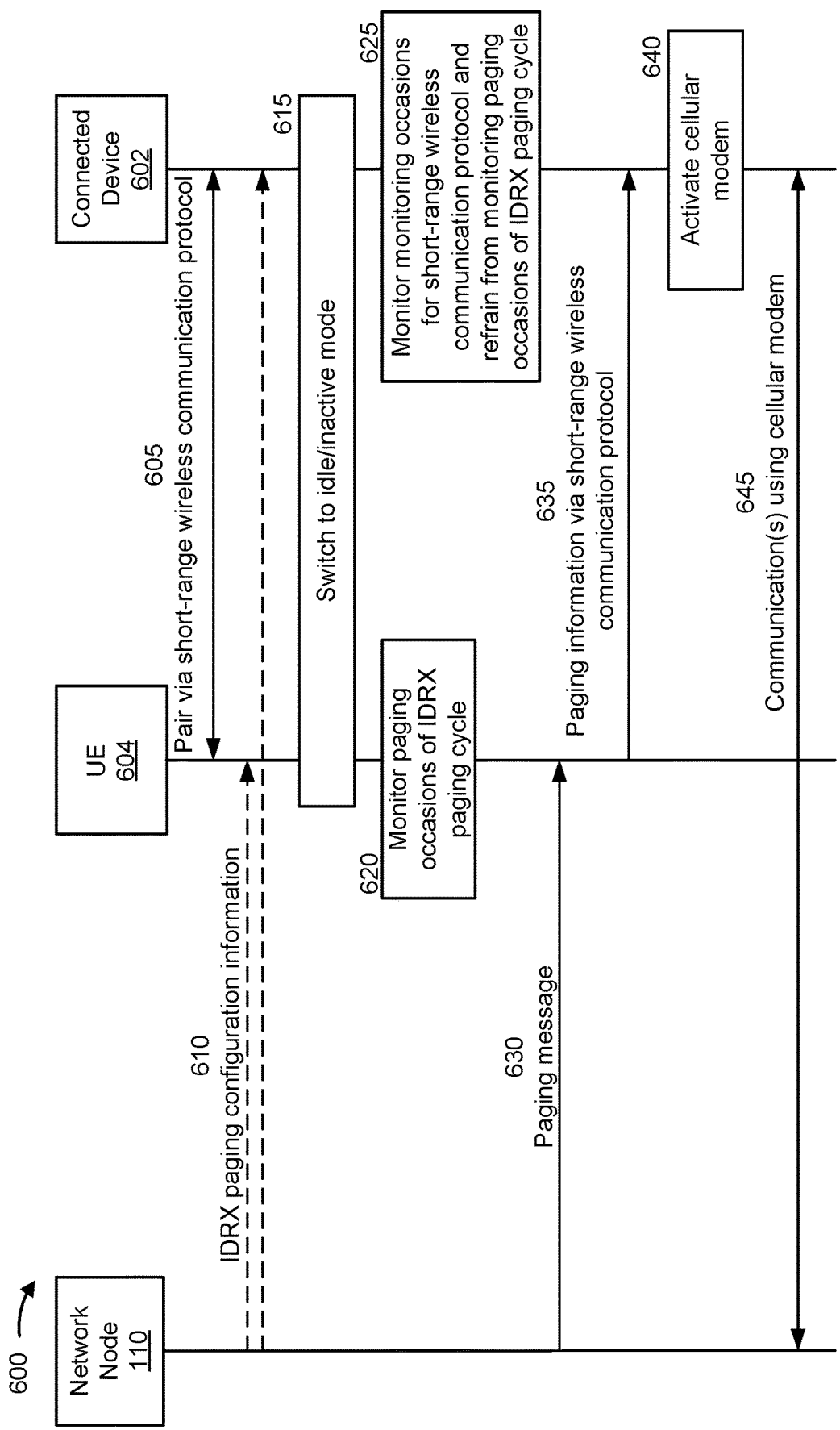
FIGS. 6A-6B are diagrams illustrating an example associated with power saving for connected devices, in accordance with the present disclosure.
Figure 6B:
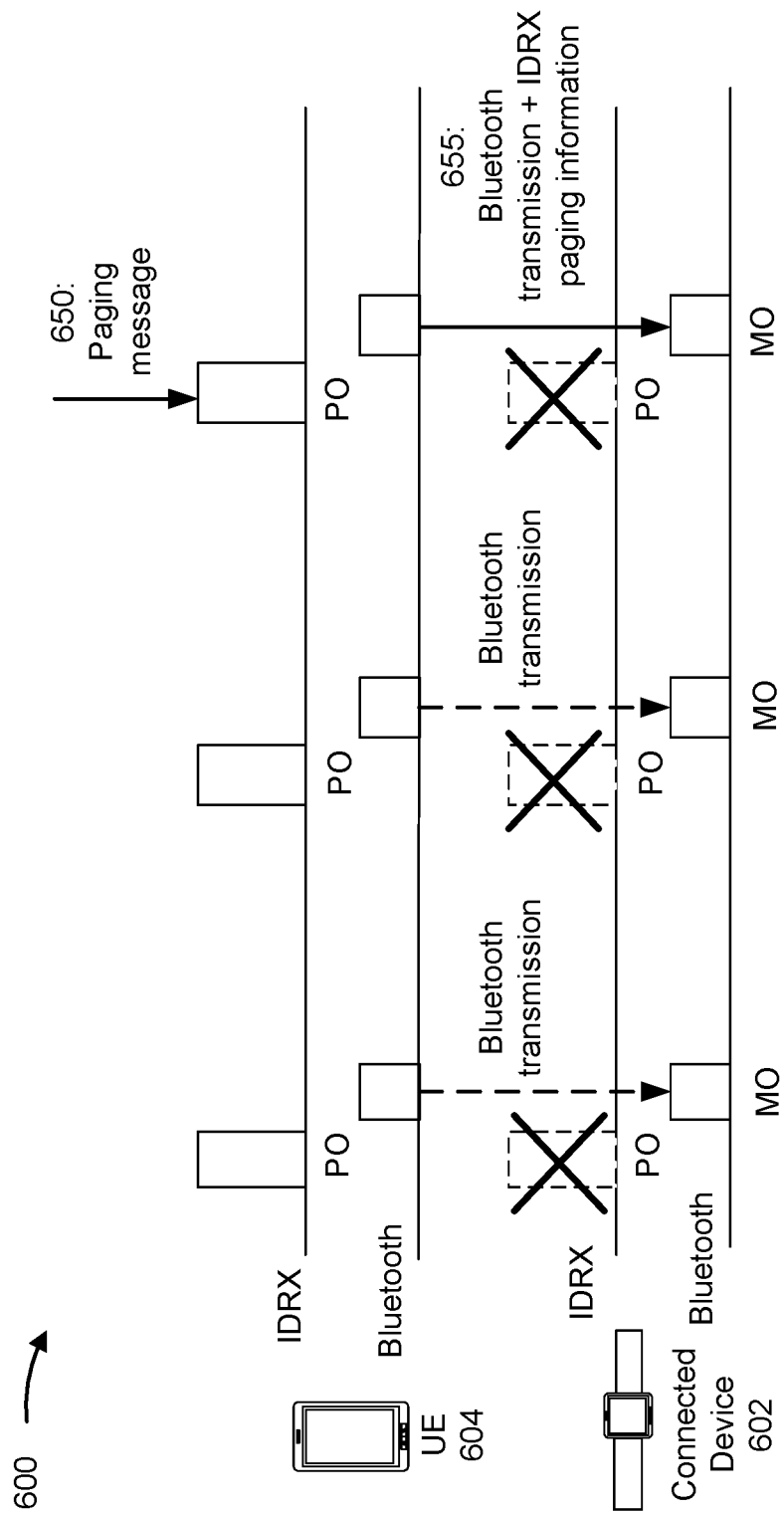

FIGS. 6A-6B are diagrams illustrating an example 600 associated with power saving for connected devices, in accordance with the present disclosure. As shown in FIG. 6A, example 600 includes communication between a network node 110, a connected device 602 and a UE 604. In some aspects, the network node 110, the connected device 602, and the UE 604 may be included in a wireless network, such as wireless network 100. The network node 110 may communicate with the UE 604 and/or the connected device 602 via a wireless access link, which may include an uplink and a downlink. The connected device 602 and the UE 604 may communicate via a short-range wireless communication protocol (e.g., Bluetooth or another short-range wireless communication protocol), as described above in connection with FIG. 4. In some aspects, the connected device 602 may be a first UE (e.g., UE 120), and the UE 604 may be a second UE (e.g., UE 120). In some aspects, the connected device 602 may be a wearable device (e.g., a smart watch, smart clothing, smart glasses, a smart wristband, smart jewelry (e.g., a smart ring or a smart bracelet)). In some aspects, the UE 604 may be a companion UE to the connected device 602. For example, the UE 604 and the connected device 602 may be associated with the same user.

As shown in FIG. 6A, and by reference number 605, the connected device 602 and the UE 604 may pair with each other via the short-range wireless communication protocol. The UE 604 and the connected device 602 may pair (e.g., establish a connection) with each other via the short-range wireless communication protocol (e.g., via a PAN or a wireless local area network (WLAN)) to enable the UE 604 and the connected device 602 to communicate using the short-range wireless communication protocol. For example, the UE 604 may detect that the connected device 602 is within a range of the UE 604 and pair with the connected device 602 via Bluetooth to enable Bluetooth communication between the first UE and the second UE. In this case, the UE 604 may perform a Bluetooth inquiry procedure to discover that the connected device 602 is within the range of the UE 604, and the UE 604 and the connected device 602 may perform a Bluetooth paging procedure to establish a connection (e.g., pairing) between the UE 604 and the connected device 602. In some aspects, the UE 604 may be a master device (e.g., a Bluetooth master device) and the connected device 602 may be a slave device (e.g., Bluetooth slave device).

In some aspects, the operations of the UE 604 described in connection with FIGS. 6A-6B may be performed by the master device, and the operations of the connected device 602 described in connection with FIGS. 6A-6B may be performed by the slave device. In some aspects, the UE 604 may be a default master device, and the connected device 602 may be a default slave device. In some aspects, when the UE 604 and the connected device 602 pair with each other via the short-range wireless communication protocol, the UE 604 and/or the connected device 602 may select or determine the master device and the slave device for the IDRX paging sharing described herein. In some examples, the selection of the master device may be based at least in part on the battery capacity and/or the current battery status of each device. For example, the device with the larger battery capacity and/or the most remaining battery life may be selected as the master device. In some examples, the device with good signal strength (e.g., resulting in a faster channel estimation process) and/or better processing capability may be selected as the master device. For example, mobile semiconductor devices, such as mobile phones, may be better processing capability in terms of offline hardware blocks, as compared with wearable devices, and thus may perform faster decoding of received signals. In some examples, such as in a high-speed mobility case, the master device may be selected as the device that detects the best cell (e.g., based at least in part on one or more cell measurements).

In some aspects, the UE 604 and the connected device 602 may dynamically switch which device is the master device and which device is the slave device for IDRX paging sharing. For example, the UE 604 may be the master device and the connected device 602 may be the slave device. The master device (e.g., the UE 604) may determine to switch the master device and the slave device based at least in part on current battery status, signal strength, and/or cell quality, among other examples. In this case, the master device (e.g., the UE 604) may dynamically indicate to the slave device (e.g., the connected device 602), via the short-range communication protocol (e.g., the PAN), that the slave device (e.g., the connected device 602) is to become the master device. The slave device (e.g., the connected device 602) may then become the new master device, and the master device (e.g., the UE 604) may then become the new slave device for IDRX sharing. In this case, the new master device (e.g., the connected device 602) may then perform operations of the UE 604 described herein (e.g., monitoring IDRX paging occasions and transmitting paging information to the slave device), and the new slave device (e.g., the UE 604) may then perform operations of the connected device 602 described herein (e.g., refraining from monitoring the IDRX paging occasions.

As further shown in FIG. 6A, and by reference number 610, the network node 110 may transmit IDRX paging configuration information. The UE 604 and/or the connected device 602 may receive the IDRX paging configuration information. The IDRX paging configuration information may configure an IDRX paging cycle that includes paging occasions to be monitored by the UE 604 and/or the connected device 602 while operating in an idle or inactive mode (e.g., an RRC idle or inactive mode). In some aspects, the IDRX paging configuration information may indicate a periodicity at which the paging occasions occur. In one example, the paging occasions may be configured with a periodicity of 1.28 seconds. In other examples, the paging occasions may be configured with different periodicities. In some aspects, the IDRX paging configuration information may be included in an SIB transmitted (e.g., broadcast) by the network node 110.

As further shown in FIG. 6A, and by reference number 615, the UE 604 and the connected device 602 may switch to an idle or inactive mode. For example, the UE 604 and the connected device 602 may switch from an RRC connected mode to an RRC idle or inactive mode. For example, the UE 604 may switch from the RRC connected mode to the RRC idle or inactive mode if there is no data to be transmitted between the network node 110 and the UE 604 (e.g., no downlink data to be transmitted to the UE 604 and no uplink data to be transmitted from the UE 604). Similarly, the connected device 602 may switch from the RRC connected mode to the RRC idle or inactive mode if there is no data to be transmitted between the network node 110 and the connected device 602 (e.g., no downlink data to be transmitted to the connected device 602 and no uplink data to be transmitted from the UE 604). In some aspects, the UE 604 and/or the connected device 602 may switch to the idle or inactive mode based at least in part on an indication transmitted by the network node 110. For example, the UE 604 and/or the connected device 602 may transition to the RRC idle mode based at least in part on receiving an RRCRelease communication from the network node 110. As another example, the UE 604 and/or the connected device 602 may transition to the RRC inactive mode based at least in part on receiving an RRCRelease with suspendConfig communication from the network node 110.

As further shown in FIG. 6A, and by reference number 620, the UE 604, while operating in the idle or inactive mode (e.g., the RRC idle or inactive mode) may monitor the paging occasions of the IDRX paging cycle. For example, the UE 604 may monitor the paging occasions of the IDRX paging cycle in accordance with the IDRX paging configuration received (e.g., in an SIB) from the network node 110. In some aspects, for each of one or more paging occasions in the IDRX paging cycle, the UE 604 may monitor for PDCCH including P-RNTI DCI (e.g., DCI with CRC scrambled by P-RNTI). If the UE 604 decodes P-RNTI DCI in a paging occasion, the UE 604 may then receive and decode a paging message (e.g., included in a PDSCH communication scheduled by the P-RNTI DCI). In some aspects, in a case in which the UE 604 receives a paging message, the UE 604 may determine whether the UE 604 or the connected device 602 is paged in the paging message. For example, the UE 604 may search the decoded paging message for a first UE-ID associated with the UE 604 and a second UE-ID associated with the connected device 602 to determine whether the UE 604, the connected device 602, or both the UE 604 and the connected device 602 are paged.

As further shown in FIG. 6A, and by reference number 625, the connected device 602, while operating in the idle or inactive mode (e.g., the RRC idle or inactive mode), may monitor one or more monitoring occasions associated with the short-range wireless communication protocol and refrain from monitoring one or more paging occasions of the IDRX paging cycle. In some aspects, while operating in the idle or inactive mode, the connected device 602 may refrain from activating the cellular modem of the connected device 602 to monitor paging occasions of the IDRX paging cycle. For example, the connected device 602 may refrain from monitoring the paging occasions using the cellular modem, despite being the paging occasions being configured by the IDRX paging configuration information received (e.g., in an SIB) from the network node 110. In this case, the cellular modem may remain in a sleep state (e.g., a DRX sleep state) during the configured paging occasions of the IDRX cycle. In some aspects, the connected device 602 may refrain from activating the cellular modem of the connected device 602 to monitor the paging occasions, while operating in the idle or inactive mode, based at least in part on pairing with the UE 604 via the short-range wireless communication protocol. For example, the connected device 602 may refrain from monitoring the paging occasions of the IDRX cycle (e.g., using the cellular modem) based at least in part on a determination that the connected device 602 is currently paired with the UE 604 via the short-range wireless communication protocol.

In some aspects, the connected device 602 may refrain from monitoring the paging occasions of the IDRX cycle (and the UE 604 may monitor the paging occasions on behalf of the connected device 602) based at least in part on a determination that the connected device 602 is currently paired with the UE 604 and based at least in part on the connected device 602 being camped on a same cell (e.g., (e.g., a same cell in a public land mobile network (PLMN)) as the UE 604. In some aspects, in a case in which the connected device 602 is camped on a different cell from the UE 604, the UE 604 may transmit, to the connected device 602 via the short-range wireless communication protocol (e.g., via the PAN), an indication to force cell reselection for the idle mode for the slave device 602 to cause the slave device 602 to camp on the same cell as the UE 604. In this case, the IDRX paging sharing (e.g., the connected device 602 refraining from monitoring the paging occasions and the UE 604 monitoring the paging occasions on behalf of the connected device 602) may be triggered based at least in part on the forced cell reselection to cause the connected device 602 to camp on the same cell as the UE 604 being successful.

In some aspects, while operating in the idle or inactive mode, the connected device 602 may monitor monitoring occasions associated with the short-range wireless communication protocol. In some aspects, the monitoring occasions may be monitoring occasions for periodic transmissions, via the short-range wireless communication protocol, associated with maintaining the connection/pairing and/or synchronization between the UE 604 and the connected device 602. In some examples, the monitoring occasions may be wake-up occasions (e.g., associated with a power saving mode), in which the connected device 602 activates (or wakes-up) the short-range wireless communication transceiver to monitor for a transmission from the UE 604 for maintaining the pairing between the UE 604 and the connected device 602 and/or performing synchronization for communication between the connected device 602 and the UE 604 using the short-range wireless communication protocol. In some aspects, in a case in which the short-range wireless communication protocol is Bluetooth, the monitoring occasions may be periodic occasions at which the connected device 602 monitors (e.g., listens) for Bluetooth transmissions from the UE 604 to maintain the Bluetooth pairing and/or synchronization between the connected device 602 and the UE 604. For example, the monitoring occasions may be periodic wake-up occasions associated with a Bluetooth power saving mode (e.g., a Sniff mode), in which a Bluetooth transceiver (or Bluetooth receiver) is periodically activated (e.g., wakes-up) to listen for a Bluetooth transmission (e.g., a beacon signal or a polling signal) from the Bluetooth master device (e.g., the UE 604) that enables the Bluetooth slave device (e.g., the connected device 602) to maintain the connection with the Bluetooth master device (e.g., the UE 604).

In some aspects, when the connected device 602 is in a range of the UE 604, the UE 604 may transmit, to the connected device 602, a respective transmission via the short-range wireless communication protocol in each monitoring occasion associated with the short-range wireless communication protocol to maintain the pairing between the UE 604 and the connected device 602. For example, in the case in which the short-range wireless communication protocol is Bluetooth, the UE 604 may transmit a respective Bluetooth transmission (e.g., a beacon signal or a polling signal) in each monitoring occasion associated with a Bluetooth power saving mode (e.g., the Sniff mode). The connected device 602 may determine that the connected device 602 is still paired with the UE 604 based at least in part on receiving the transmission, via the short-range wireless communication protocol, in a latest monitoring occasion. Accordingly, in some aspects, the connected device 602, while operating in the idle or inactive mode, may continue refraining from monitoring the paging occasions of the IDRX paging cycle using the cellular modem for as long as the connected device 602 continues receiving the transmission, via the short-range wireless communication protocol, from the UE 604 in the monitoring occasions associated with the short-range wireless communication protocol.

In some aspects, the monitoring occasions associated with the short-range wireless communication protocol may have the same periodicity as the paging occasions of the IDRX cycle. In some aspects, the UE 604 (e.g., the Bluetooth master device) may set the periodicity for the monitoring occasions associated with the short-range wireless communication protocol. In this case, the UE 604 may set (e.g., via an indication transmitted to the connected device 602 using the short-range wireless communication protocol) the periodicity for the monitoring occasions associated with the short-range wireless communication protocol to be the same as the periodicity configured for the paging occasions of the IDRX cycle. For example, in a case in which the paging occasions of the IDRX cycle are configured for a periodicity of 1.28 seconds, the UE 604 may set the periodicity of the monitoring occasions associated with the short-range wireless communication protocol to be 1.28 seconds. In some aspects, the monitoring occasions associated with the short-range wireless communication protocol may be configured to be offset from the paging occasions of the IDRX paging cycle by a time offset. For example, the monitoring occasions associated with the short-range wireless communication protocol may have the same periodicity as the paging occasions of the IDRX cycle, and a starting time for each monitoring occasion associated with the short-range wireless communication protocol may be offset by the time offset from a starting location of a respective paging occasion of the IDRX paging cycle. For example, the time offset may enable the UE 604 to decode a paging message received in a paging occasion and transmit, via the short-range wireless communication protocol, paging information indicated in the paging message to the connected device 602 in a corresponding monitoring occasion that is offset from the paging occasion.

As further shown in FIG. 6A, and by reference number 630, the network node 110 may transmit, and the UE 604 may receive, a paging message in a paging occasion of the IDRX cycle. The UE 604 may receive the paging message in the paging occasion in connection with monitoring the paging occasions of the IDRX paging cycle while operating in the idle or inactive mode. For example, the network node 110 may transmit, in the paging occasion, a P-RNTI DCI (e.g., DCI with CRC scrambled by P-RNTI) and a paging message (e.g., a PDSCH paging message) scheduled by the P-RNTI DCI. The UE 604 may receive and decode the P-RNTI DCI transmitted in the paging occasion, and based at least in part on decoding the P-RNTI DCI, the UE 604 may receive and decode the paging message (e.g., the PDSCH paging message) transmitted in the paging occasion. The paging message may include paging information that indicates which UEs are paged by the paging message.

For example, the paging information may indicate that the UE 604 and/or the connected device 602 are paged.

As further shown in FIG. 6A, and by reference number 635, the UE 604 may transmit, via the short-range wireless communication protocol, paging information indicated in the paging message to the connected device 602 in a monitoring occasion associated with the short-range wireless communication protocol. The connected device 602 may receive, via the short-range wireless communication protocol, the paging information in the monitoring occasion associated with the short-range wireless communication protocol. In some aspects, the paging information may be combined with a transmission, via the short-range wireless communication protocol, for maintaining the pairing/connection and/or synchronization between the connected device 602 and the UE 604. That is, the transmission, transmitted by the UE 604 in the monitoring occasion associated with the short-range wireless communication protocol, may include information associated with the short-range wireless communication protocol (e.g., information associated with maintaining the pairing and/or synchronization) and the paging information (e.g., the IDRX paging information received by the UE 604 in the paging message). For example, in the case in which the short-range wireless communication protocol is Bluetooth, the UE 604 may transmit, to the connected device 602 in a monitoring occasion (e.g., a Bluetooth wake-up occasion), a Bluetooth transmission that combines a signal (e.g., a beacon signal or polling signal) for maintaining the pairing between the connected device 602 and the UE 604 and the paging information.

In some aspects, the paging information (e.g., IDRX paging information) transmitted by the UE 604 via the short-range wireless communication protocol may include an indication that the connected device 602 is paged by a paging message. For example, the UE 604 may determine that the connected device 602 is paged by the paging message received in the paging occasion (e.g., the paging message includes a UE-ID associated with the connected device 602), and the UE 604 may transmit, in the monitoring occasion, a transmission via the short-range wireless communication protocol that includes the indication that the connected device 602 is paged, based on the determination that the connected device 602 is paged in the paging message. In some aspects, the paging information (e.g., the IDRX paging information) transmitted by the UE 604 via the short-range wireless communication protocol may include the paging message received by the UE 604 in the paging occasion (e.g., all of the paging information included in the paging message). In some examples, the UE 604 may transmit, to the connected device 602 in the monitoring occasion, a transmission via the short-range wireless communication protocol that includes the paging message (e.g., all of the paging information included in the paging message) based at least in part on a determination that the connected device 602 is paged in the paging message. In some other examples, the UE 604 may transmit to the connected device 602 in the monitoring occasion, a transmission via the short-range wireless communication protocol that includes the paging message (e.g., all of the paging information included in the paging message) based at least in part on receiving the paging message in the paging occasion (e.g., without a determination, by the UE 604, that the connected device 602 is paged in the paging message). In this case, the connected device 602 may determine whether the connected device 602 is paged based at least in part on the paging information received via the short-range wireless communication protocol, for example, by searching for a UE-ID associated with the connected device 602 in the paging information.

In some aspects, the monitoring occasion associated with the short-range wireless communication protocol in which the UE 604 transmits the paging information to the connected device 602 may be offset by a time offset from the paging occasion in which the paging message is received by the UE 604.

FIG. 6B shows an example of IDRX paging for the connected device 602 and the UE 604. In the example shown in FIG. 6B, the short-range wireless communication protocol is Bluetooth, and the connected device 602 and the UE 604 are paired via Bluetooth. As shown in FIG. 6B, the UE 604, while operating in the idle or inactive mode, monitors paging occasions (shown as "PO") of an IDRX paging cycle. The connected device 602, while operating in the idle or inactive mode, does not monitor the paging occasions of the IDRX paging cycle. That is, the connected device 602 refrains from activating the cellular modem of the connected device 602 to monitor the paging occasions of the IDRX paging cycle. In this case, the cellular modem of the connected device may remain in a sleep state (e.g., a DRX sleep state) during the paging occasions of the IDRX cycle. For example, the connected device 602 may refrain from monitoring the paging occasions of the IDRX paging cycle based at least in part on the connected device 602 being paired with the UE 604 via Bluetooth.

The connected device 602, while operating in the idle or inactive mode, may monitor Bluetooth monitoring occasions (shown as "MO"). For example, the Bluetooth monitoring occasions may be wake-up occasions, in which the connected device 602 activates (or wakes-up) a Bluetooth transceiver (or Bluetooth receiver) of the connected device 602 to monitor (or listen) for Bluetooth transmissions from the UE 604. The UE 604 may transmit, to the connected device 602 (e.g., using a Bluetooth transceiver or transmitted), a Bluetooth transmission (e.g., a beacon signal or a polling signal) in each Bluetooth monitoring occasion. The Bluetooth transmission, transmitted by the UE 604 and received by the connected device 602 in each Bluetooth monitoring occasion, may enable the connected device 602 to remain paired with the UE 604 and/or to synchronize with the UE 604 for Bluetooth communications. As shown in FIG. 6B, the Bluetooth monitoring occasions may have the same periodicity as the paging occasions of the IDRX paging cycle. Furthermore, in some aspects, a starting time for each Bluetooth monitoring occasion may be offset from a starting time for a respective paging occasion of the IDRX cycle, by a time offset.

As shown by reference number 650, the UE 604 may receive a paging message in a paging occasion of the IDRX cycle (e.g., the third paging occasion shown in FIG. 6B). For example, the paging message may be transmitted by the network node 110 in the paging occasion. The paging message may indicate that the connected device 602 is being paged. As shown by reference number 655, the UE 604 may transmit, to the connected device 602 in a Bluetooth monitoring occasion (e.g., the third Bluetooth monitoring occasion shown in FIG. 6B), a Bluetooth transmission that includes IDRX paging information indicated in the paging message. The connected device 602 may receive the Bluetooth transmission that includes the IDRX paging information in the monitoring occasion. In some aspects, the Bluetooth transmission may combine the Bluetooth transmission (e.g., the beacon signal or the polling signal) that enables the connected device 602 to remain paired with the UE 604 and/or to synchronize with the UE 604 for Bluetooth communications with the IDRX paging information. For example, the IDRX paging information may include an indication that the connected device 602 is paged in the paging message received by the UE 604.

Returning to FIG. 6A, as shown by reference number 640, in some aspects, the connected device 602 may activate the cellular modem of the connected device 602 based at least in part on receiving the paging information (e.g., the IDRX paging information) from the UE 604 via the short-range wireless communication protocol. For example, the connected device 602 may activate the cellular modem based at least in part on the paging information indicating that the connected device 602 is paged.

As shown by reference number 645, the connected device 602 may communicate with the network node 110 using the cellular modem of the connected device 602. In some aspects, the connected device 602 may activate the cellular modem and communicate with the network node 110 using the cellular modem, based at least in part on the paging information (IDRX paging information) indicating that the connected device 602 is paged. For example, the connected device 602 may be paged to inform the connected device 602 that there is an incoming connection request, a system information update, or a short message for the connected device 602. In some aspects, in connection with an incoming connection request for the connected device 602, the connected device 602 may communicate with the network node 110 to establish a connection (e.g., an RRC connection) with the network node 110. In this case, the connected device 602 may transition from the idle or inactive mode (e.g., RRC idle or RRC inactive mode) to a connected mode (e.g., RRC connected mode). In some aspects, the connected device 602 may communicate with the network node 110 to receive a system information update transmitted by the network node 110. In some aspects, the connected device 602 may communicate with the network node 110 to receive a short message (e.g., a mobile-terminated small data transmission) from the network node 110.

In some aspects, the operations described in connection with FIGS. 6A-6B may be combined with the operations described below in connection with FIGS. 8A-8B. For example, the IDRX paging sharing discussed in connection with FIGS. 6A-6B may be performed by the UE 604 and the connected device 602 while operating in the idle or inactive mode, and wake-up signal (WUS) sharing discussed in connection with FIGS. 8A-8B may be performed by UE 604 and the connected device 602 while operating in a connected mode (e.g., RRC connected mode). In this case, the UE 604 may perform operations of the master device 804 discussed in connection with FIGS. 8A-8B, and the connected device 706 may perform operations of the slave device 802 discussed in connection with FIGS. 8A-8B.

As indicated above, FIGS. 6A-6B are provided as an example. Other examples may differ from what is described with respect to FIGS. 6A-6B.

Figure 7:
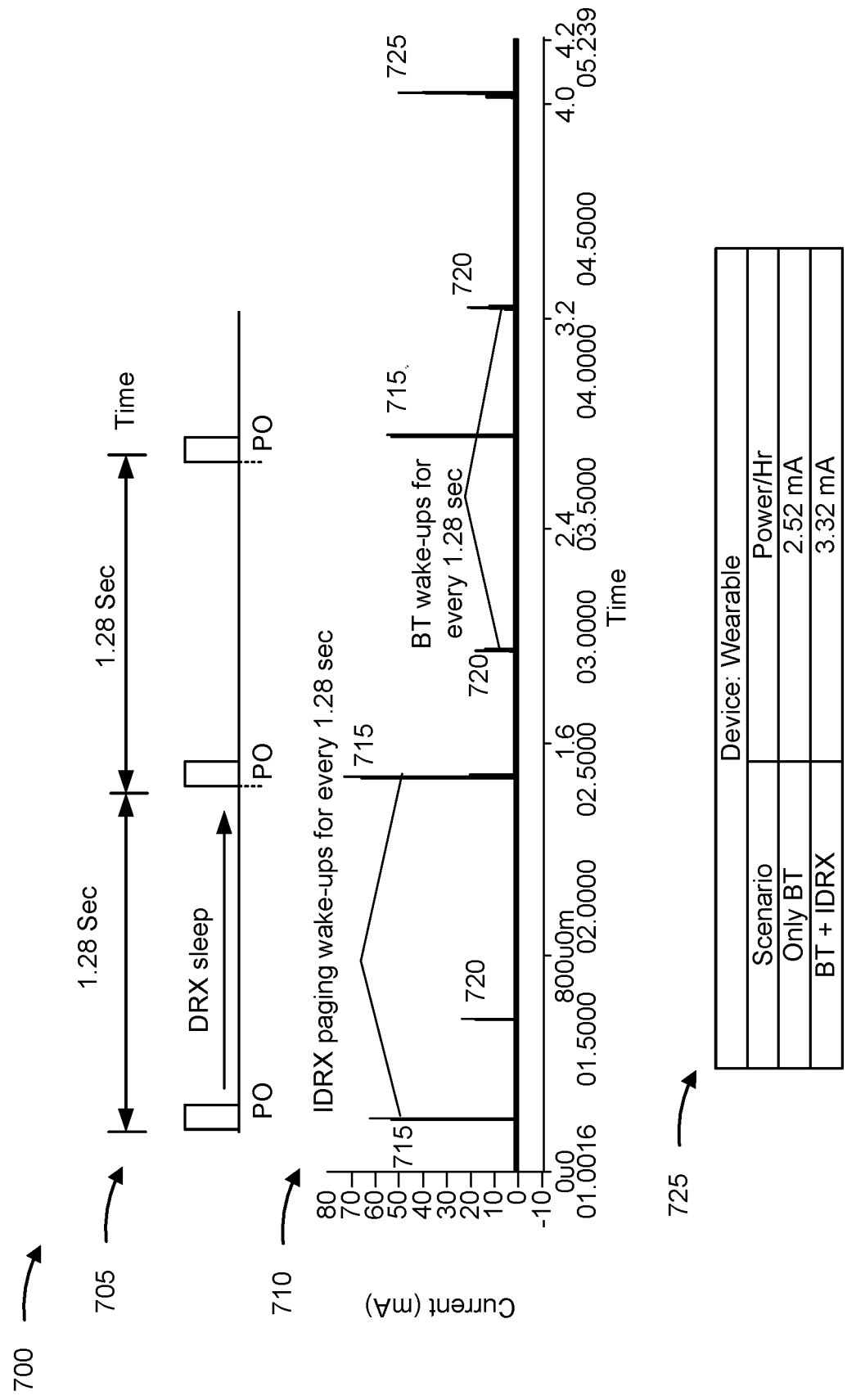
FIG. 7 is a diagram illustrating an example of power consumption for a connected device, in accordance with the present disclosure.

FIG. 7 is a diagram illustrating an example 700 of power consumption for a connected device, in accordance with the present disclosure. As shown in FIG. 7, example 700 shows example power consumption for a connected device (e.g., a wearable device, such as a smart watch) with a IDRX paging cycle 705 with paging occasions having a periodicity of 1.28 seconds. Graph 710 shows example power consumption measurements associated with a cellular modem of the connected device waking up every 1.28 seconds to monitor the paging occasions for IDRX paging (shown by reference number 715) and example power consumption measurements associated with a Bluetooth receiver/transceiver of the connected device waking up every 1.28 seconds to monitor for Bluetooth transmissions (e.g., from a companion UE paired with the connected device) (shown by reference number 720). As shown in table 725, in the example shown in FIG. 7 (e.g., for a wearable device), the combination of individual wake-ups (e.g., of the Bluetooth receiver/transceiver) for monitoring for Bluetooth transmissions and individual wake-ups (e.g., of the cellular modem) for monitoring for IDRX paging results in a power consumption of 3.32 mA per hour, whereas the wake-ups (e.g., of the Bluetooth receive/transceiver) for monitoring for Bluetooth transmissions while remaining in a sleep state for the IDRX paging occasions results in a power consumption of 2.52 mA per hour. Accordingly, in this example, by refraining from activating the cellular modem to monitor the IDRX paging occasions, as discussed above in connection with FIGS. 6A-6B, power savings of 24% in a standby mode (e.g., the idle mode or the inactive mode) may be achieved by the connected device (e.g., the wearable device).

As indicated above, FIG. 7 is provided as an example. Other examples may differ from what is described with respect to FIG. 7.

Figure 8A:
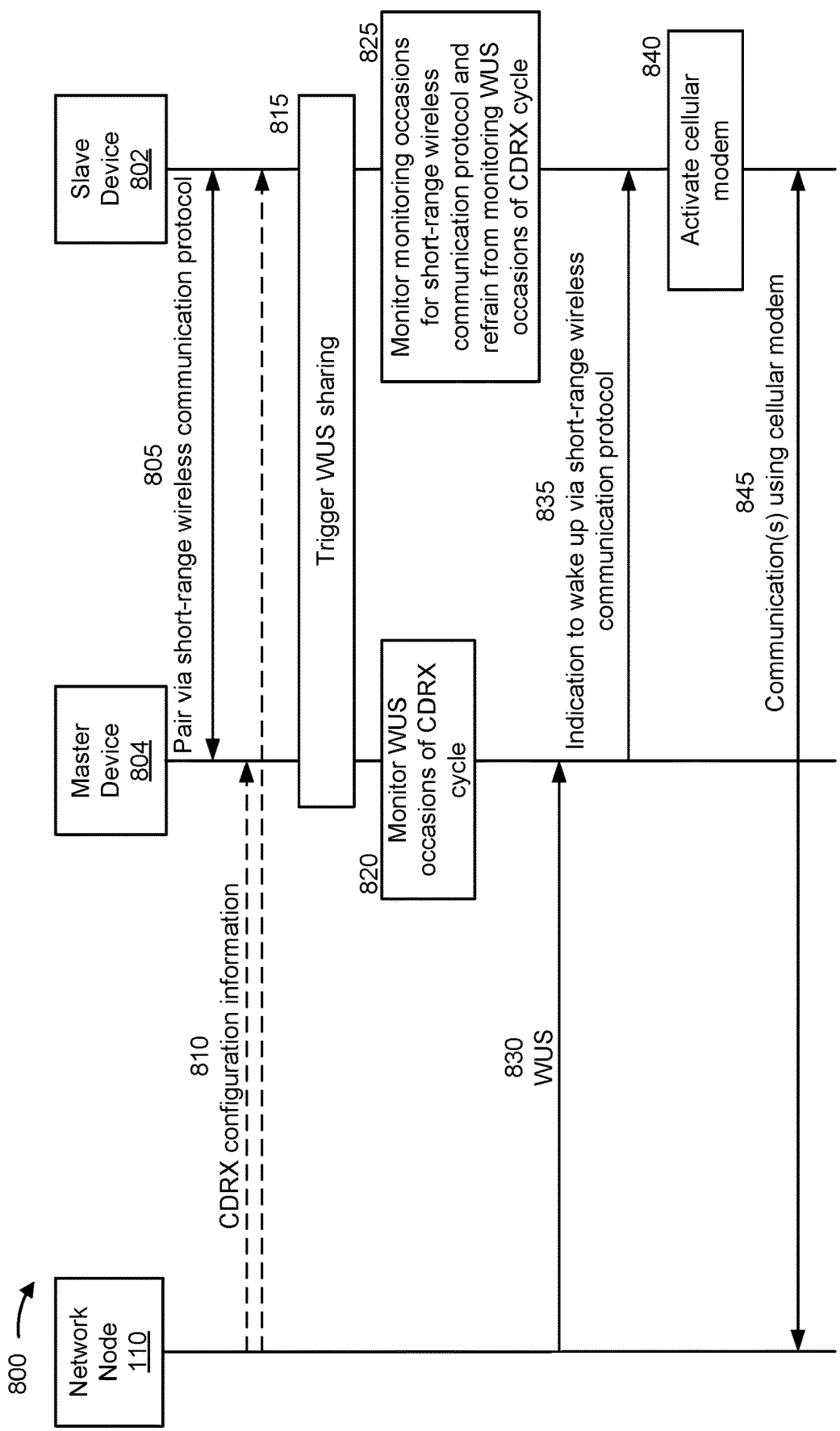
FIGS. 8A-8B are diagrams illustrating an example associated with power saving for connected devices, in accordance with the present disclosure.
Figure 8B:
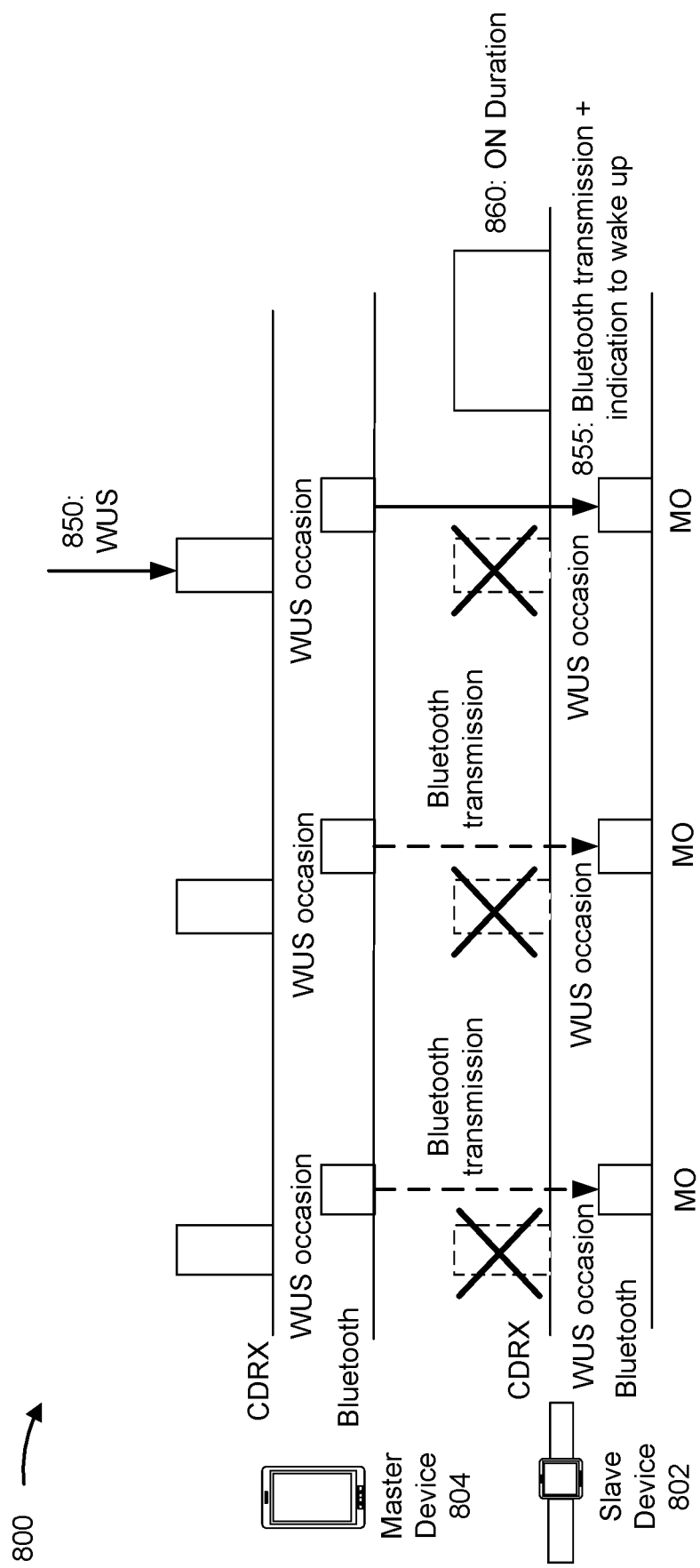

FIGS. 8A-8B are diagrams illustrating an example 800 associated with power saving for connected devices, in accordance with the present disclosure. As shown in FIG. 8A, example 800 includes communication between a network node 110, a slave device 802 and a master device 804. In some aspects, the network node 110, the slave device 802, and the master device 804 may be included in a wireless network, such as wireless network 100. The network node 110 may communicate with the master device 804 and/or the slave device 802 via a wireless access link, which may include an uplink and a downlink. The slave device 802 and the master device 804 may communicate via a short-range wireless communication protocol (e.g., Bluetooth or another short-range wireless communication protocol), as described above in connection with FIG. 4. In some aspects, the slave device 802 may be a first UE (e.g., UE 120), and the master device 804 may be a second UE (e.g., UE 120). In some aspects, the slave device 802 may be a connected device, such as wearable device (e.g., a smart watch, smart clothing, smart glasses, a smart wristband, smart jewelry (e.g., a smart ring or a smart bracelet)). In some aspects, the master device 804 may be a companion UE to the slave device 802. For example, the master device 804 and the slave device 802 may be associated with the same user.

As shown in FIG. 8A, and by reference number 805, the slave device 802 and the master device 804 may pair with each other via the short-range wireless communication protocol. The master device 804 and the slave device 802 may pair (e.g., establish a connection) with each other via the short-range wireless communication protocol (e.g., via a PAN or a wireless local area network (WLAN)) to enable the master device 804 and the slave device 802 to communicate using the short-range wireless communication protocol. For example, the master device 804 may detect that the slave device 802 is within a range of the master device 804 and pair with the slave device 802 via Bluetooth to enable Bluetooth communication between the first UE and the second UE. In this case, the master device 804 may perform a Bluetooth inquiry procedure to discover that the slave device 802 is within the range of the master device 804, and the master device 804 and the slave device 802 may perform a Bluetooth paging procedure to establish a connection (e.g., pairing) between the master device 804 and the slave device 802.

In some aspects, the master device 804 may be a UE (e.g., UE 604) and the slave device 802 may be a connected device (e.g., connected device 602) associated with the UE. In some aspects, the master device 804 may be a default master device, such as a UE, and the slave device 802 may be a default slave device, such as a connected device. In some aspects, when devices (e.g., a UE and a connected device) pair with each other via the short-range wireless communication protocol, at least one of the devices may select or determine which device is the master device 804 and which device is the slave device 802 for the WUS sharing described herein. In this case, the master device 804 may be the UE and the slave device 802 may be a connected device, or the master device 804 may be the connected device and the slave device 802 may be the UE. In some examples, the selection of the master device 804 may be based at least in part on the battery capacity and/or the current battery status of each device. For example, the device with the larger battery capacity and/or the most remaining battery life may be selected as the master device 804. In some examples, the device with good signal strength (e.g., resulting in a faster channel estimation process) and/or better processing capability may be selected as the master device 804. For example, mobile semiconductor devices, such as mobile phones, may be better processing capability in terms of offline hardware blocks, as compared with wearable devices, and thus may perform faster decoding of received signals. In some examples, in a case in which different DRX cycles are configured for the devices, the device configured with a lower DRX cycle may be selected as the master device 804. For example, a device configured with a lower long DRX cycle may have more frequent WUS occasions, as compared with a device with configured with a higher long DRX cycle. In some examples, such as in a high-speed mobility case, the master device 804 may be selected as the device that detects the best cell (e.g., based at least in part on one or more cell measurements).

In some aspects, the master device 804 and the slave device 802 may dynamically switch which device is the master device 804 and which device is the slave device 802 for WUS sharing. For example, a UE may be the current master device 804 and a connected device may be the current slave device 802. The current master device (e.g., the UE) may determine to switch the master device and the slave device based at least in part on current battery status, signal strength, and/or cell quality, among other examples. In this case, the current master device (e.g., the UE) may dynamically indicate to the current slave device (e.g., the connected device), via the short-range communication protocol (e.g., the PAN), that the current slave device (e.g., the connected device) is to become the master device. The slave device (e.g., the connected device) may then become the new master device, and the master device (e.g., the UE) may then become the new slave device for WUS sharing. That is, the new master device (e.g., the connected device) then performs operations of the master device 804 described herein (e.g., monitoring WUS occasions and transmitting indications to wake up to the slave device 802), and the new slave device (e.g., the UE) then performs operations of the slave device 802 described herein (e.g., refraining from monitoring the WUS occasions).

As further shown in FIG. 8A, and by reference number 810, the network node 110 may transmit connected mode DRX (CDRX) configuration information. The master device 804 and/or the slave device 802 may receive the CDRX configuration information. The CDRX configuration information may configure a CDRX cycle for the master device 804 and/or the slave device 802. For example, the master device 804 and the slave device 802 may be configured with the same CDRX cycle or with different CDRX cycles. The CDRX cycle may include a DRX on duration (e.g., during which a device is awake or in an active state) and an opportunity to enter a DRX sleep state. The DRX on duration may be referred to as an active time, during which the device (e.g., the master device 804 or the slave device 802) may monitor a PDCCH for DCI pertaining to the device. The DRX sleep state may be referred to as an inactive time, during which the device (e.g., the master device 804 or the slave device 802) may refrain from monitoring the PDCCH. The CDRX configuration information may also configure an inactivity timer, which corresponds to an amount of time that the device is to remain in the active state if the device detects and/or successfully decodes a PDCCH communication intended for the device. In some aspects, the CDRX cycle configured by the CDRX configuration information may include WUS occasions, in which the device (e.g., the master device 804 or the slave device 802) is to monitor for a WUS. Each WUS occasion may be prior to a respective DRX on duration, and offset from the respective DRX on duration by a time offset. The WUS may be a DCI format 2_6 communication. The configured WUS occasions enable a device (e.g., the master device 804 or the slave device 802) to wake up (e.g., switch to the active state from the DRX sleep state) to monitor only for a WUS (DCI format 2_6 information) from the network node 110 that includes a data indication for the device, before the DRX on duration timer (e.g., the inactivity timer) starts. The device may only wake up for the DRX on duration if the data indication flag for the device in the WUS is true (e.g., a value indicating that there is data to be transmitted to the device).

As further shown in FIG. 8A, and by reference number 815, the master device 804 and/or the slave device 802 may trigger WUS sharing while operating in the RRC connected mode. WUS sharing refers to the slave device 802 refraining from monitoring WUS occasions and the master device 804 monitoring WUS occasions on behalf of the slave device 802, as described in greater detail below. In some aspects, the WUS sharing may be triggered based at least in part on the slave device 802 being camped on a same cell (e.g., a same cell in a PLMN) as the master device 804. For example, the master device 804 and the slave device 804 may be triggered to begin the WUS sharing when the master device 804 and the slave device 802 are paired via the PAN and camped on the same cell. In some aspects, in a case in which the slave device 802 is camped on a different cell from the master device 804, the master device 804 may transmit, to the slave device 802 via the short-range wireless communication protocol (e.g., via the PAN), an indication to force the slave device 802 to perform an intra-frequency handover to switch to the cell on which the master device 804 is camped. In this case, the WUS sharing may be triggered in connection with the forced intra-frequency handover being successful for the slave device 802. In some other aspects, in a case in which the slave device 802 is camped on a different cell from the master device 804, if the slave device 802 is camped on a cell with a lower long DRX cycle (e.g., with an internet protocol multimedia subsystem (IMS) packet data network (PDN)), the slave device 802 may skip or refrain from the connected mode WUS sharing described herein.

As further shown in FIG. 8A, and by reference number 820, the master device 804, while operating in the connected mode (e.g., the RRC connected mode) may monitor the WUS occasions of the CDRX cycle. For example, the master device 804 may monitor the WUS occasions associated with the CDRX cycle in accordance with the CDRX configuration information received from the network node 110. In some aspects, for each of one or more WUS occasions, the master device 804 may monitor for a WUS (e.g., a PDCCH communication including DCI format 2_6). The WUS monitoring may be triggered in the master device 804, but not in the slave device 802. The master device may decode the WUS (e.g., the DCI format 2_6) for the slave device 802 and well as for the master device 804. For example, the master device 804 may decode DCI format 2_6 associated with the master device 804 to determine whether data availability is indicated for the master device 804, and the master device 804 may also decode DCI format 2_6 associated with the slave device 802 to determine whether data availability is indicated for the slave device 802.

As further shown in FIG. 8A, and by reference number 825, the slave device 802, while operating in the connected mode (e.g., the RRC connected mode), may monitor one or more monitoring occasions associated with the short-range wireless communication protocol and refrain from monitoring one or more WUS occasions of the CDRX cycle. In some aspects, while operating in the idle or inactive mode, the slave device 802 may refrain from activating the cellular modem of the slave device 802 to monitor WUS occasions of the CDRX cycle. For example, the slave device 802 may refrain from monitoring the WUS occasions using the cellular modem, despite being the WUS occasions being configured for the slave device 802 by the CDRX configuration information received from the network node 110. In this case, the cellular modem may remain in a sleep state (e.g., a DRX sleep state) during the configured WUS occasions of the CDRX cycle. In some aspects, the slave device 802 may refrain from activating the cellular modem of the slave device 802 to monitor the WUS occasions, while operating in the connected mode, based at least in part on pairing with the master device 804 via the short-range wireless communication protocol. For example, the slave device 802 may refrain from monitoring the WUS occasions of the CDRX cycle (e.g., using the cellular modem) based at least in part on a determination that the slave device 802 is currently paired with the master device 804 via the short-range wireless communication protocol and based at least in part on a determination that the slave device 802 is camped on the same cell as the master device 804.

In some aspects, while operating in the connected mode, the slave device 802 may monitor monitoring occasions associated with the short-range wireless communication protocol. In some aspects, the monitoring occasions may be monitoring occasions for periodic transmissions, via the short-range wireless communication protocol, associated with maintaining the connection/pairing and/or synchronization between the master device 804 and the slave device 802. In some examples, the monitoring occasions may be wake-up occasions (e.g., associated with a power saving mode), in which the slave device 802 activates (or wakes-up) the short-range wireless communication transceiver to monitor for a transmission from the master device 804 for maintaining the pairing between the master device 804 and the slave device 802 and/or performing synchronization for communication between the slave device 802 and the master device 804 using the short-range wireless communication protocol. In some aspects, in a case in which the short-range wireless communication protocol is Bluetooth, the monitoring occasions may be periodic occasions at which the slave device 802 monitors (e.g., listens) for Bluetooth transmissions from the master device 804 to maintain the Bluetooth pairing and/or synchronization between the slave device 802 and the master device 804. For example, the monitoring occasions may be periodic wake-up occasions associated with a Bluetooth power saving mode (e.g., a Sniff mode), in which a Bluetooth transceiver (or Bluetooth receiver) is periodically activated (e.g., wakes-up) to listen for a Bluetooth transmission (e.g., a beacon signal or a polling signal) from the Bluetooth master device (e.g., the master device 804) that enables the Bluetooth slave device (e.g., the slave device 802) to maintain the connection with the Bluetooth master device (e.g., the master device 804).

In some aspects, when the slave device 802 is in a range of the master device 804, the master device 804 may transmit, to the slave device 802, a respective transmission via the short-range wireless communication protocol in each monitoring occasion associated with the short-range wireless communication protocol to maintain the pairing between the master device 804 and the slave device 802. For example, in the case in which the short-range wireless communication protocol is Bluetooth, the master device 804 may transmit a respective Bluetooth transmission (e.g., a beacon signal or a polling signal) in each monitoring occasion associated with a Bluetooth power saving mode (e.g., the Sniff mode). The slave device 802 may determine that the slave device 802 is still paired with the master device 804 based at least in part on receiving the transmission, via the short-range wireless communication protocol, in a latest monitoring occasion. Accordingly, in some aspects, the slave device 802 may continue refraining from monitoring the WUS occasions of the CDRX cycle using the cellular modem for as long as the slave device 802 continues receiving the transmission, via the short-range wireless communication protocol, from the master device 804 in the monitoring occasions associated with the short-range wireless communication protocol.

In some aspects, the monitoring occasions associated with the short-range wireless communication protocol may have the same periodicity as the WUS occasions of the CDRX cycle. In some aspects, the master device 804 (e.g., the Bluetooth master device) may set the periodicity for the monitoring occasions associated with the short-range wireless communication protocol. In this case, the master device 804 may set (e.g., via an indication transmitted to the slave device 802 using the short-range wireless communication protocol) the periodicity for the monitoring occasions associated with the short-range wireless communication protocol to be the same as the periodicity configured for the WUS occasions of the CDRX cycle. In some aspects, the monitoring occasions associated with the short-range wireless communication protocol may be configured to be offset from the WUS occasions of the CDRX paging cycle by a time offset. For example, the monitoring occasions associated with the short-range wireless communication protocol may have the same periodicity as the WUS occasions of the CDRX cycle, and a starting time for each monitoring occasion associated with the short-range wireless communication protocol may be offset by the time offset from a starting location of a respective WUS occasion. For example, the time offset may enable the master device 804 to decode a WUS received in a WUS occasion and transmit, to the slave device 802 in a corresponding monitoring occasion associated with the short-range wireless communication protocol, an indication to wake up.

As further shown in FIG. 8A, and by reference number 830, the network node 110 may transmit, and the master device 804 may receive, a WUS in a WUS occasion of the CDRX cycle. The master device 804 may receive the WUS in the WUS occasion in connection with monitoring the WUS occasions of the CDRX cycle while operating in the connected mode. For example, the network node 110 may transmit, in the WUS occasion, a WUS (e.g., DCI format 2_6) that includes a data availability indication associated with the slave device 802 (e.g., an indication that data is available to be transmitted to the slave device 802). The master device 804 may receive and decode the WUS (e.g., DCI format 2_6) transmitted in the WUS occasion, and determine, based on decoding the WUS, that the WUS indicates data availability for the slave device 802.

As further shown in FIG. 8A, and by reference number 835, the master device 804 may transmit, to the slave device 802 via the short-range wireless communication protocol, an indication to wake up. The master device 804 may transmit the indication to wake up in a monitoring occasion associated with the short-range wireless communication protocol. The slave device 802 may receive, via the short-range wireless communication protocol, the indication to wake up transmitted by the master device 804 in the monitoring occasion associated with the short-range wireless communication protocol. In some aspects, the indication to wake up may be combined with a transmission, via the short-range wireless communication protocol, for maintaining the pairing/connection and/or synchronization between the slave device 802 and the master device 804. That is, the transmission, transmitted by the master device 804 in the monitoring occasion associated with the short-range wireless communication protocol, may include information associated with the short-range wireless communication protocol (e.g., information associated with maintaining the pairing and/or synchronization) and the indication to wake up. For example, in the case in which the short-range wireless communication protocol is Bluetooth, the master device 804 may transmit, to the slave device 802 in a monitoring occasion (e.g., a Bluetooth wake-up occasion), a Bluetooth transmission that combines a signal (e.g., a beacon signal or polling signal) for maintaining the pairing between the slave device 802 and the master device 804 and the indication to wake up.

In some aspects, the indication to wake up transmitted by the master device 804 via the short-range wireless communication protocol may include an indication that a WUS indicated data availability for the slave device 802. For example, the master device 804 may determine that the WUS indicates that data is available to be transmitted to the slave device 802, and the master device 804 may transmit, in the monitoring occasion, a transmission via the short-range wireless communication protocol that includes the indication that the slave device 802 is to wake up for a DRX on duration to monitor for one or more downlink communications, based on the determination that the WUS indicates that data is available to be transmitted to the slave device 802. In some other aspects, the master device 804 may decode the WUS and a PDSCH communication on behalf of the slave device 802, and the master device 804 may transmit, to the slave device 802 in the monitoring occasion associated with the short-range wireless communication protocol, the data received in the PDSCH communication decoded on behalf of the slave device 802.

FIG. 8B shows an example of WUS sharing for the slave device 802 and the master device 804. In the example shown in FIG. 8B, the short-range wireless communication protocol is Bluetooth, and the slave device 802 and the master device 804 are paired via Bluetooth. As shown in FIG. 8B, the master device 804, while operating in the connected mode, monitors WUS occasions of an CDRX cycle. The slave device 802, while operating in the connected mode, does not monitor the WUS occasions of the CDRX cycle. That is, the slave device 802 refrains from activating the cellular modem of the slave device 802 to monitor the WUS occasions of the CDRX cycle. In this case, the cellular modem of the slave device 802 may remain in a sleep state (e.g., a DRX sleep state) during the WUS occasions of the CDRX cycle. For example, the slave device 802 may refrain from monitoring the WUS occasions based at least in part on the slave device 802 being paired with the master device 804 via Bluetooth.

The slave device 802, while operating in the connected mode, may monitor Bluetooth monitoring occasions (shown as "MO"). For example, the Bluetooth monitoring occasions may be wake-up occasions, in which the slave device 802 activates (or wakes-up) a Bluetooth transceiver (or Bluetooth receiver) of the slave device 802 to monitor (or listen) for Bluetooth transmissions from the master device 804. The master device 804 may transmit, to the slave device 802 (e.g., using a Bluetooth transceiver or transmitted), a Bluetooth transmission (e.g., a beacon signal or a polling signal) in each Bluetooth monitoring occasion. The Bluetooth transmission, transmitted by the master device 804 and received by the slave device 802 in each Bluetooth monitoring occasion, may enable the slave device 802 to remain paired with the master device 804 and/or to synchronize with the master device 804 for Bluetooth communications. As shown in FIG. 8B, the Bluetooth monitoring occasions may have the same periodicity as the WUS occasions of the CDRX cycle. Furthermore, in some aspects, a starting time for each Bluetooth monitoring occasion may be offset from a starting time for a respective WUS occasion of the CDRX cycle, by a time offset.

As shown by reference number 850, the master device 804 may receive a WUS in a WUS occasion of the CDRX cycle (e.g., the third WUS occasion shown in FIG. 8B). For example, the WUS may be transmitted by the network node 110 in the WUS occasion. The WUS may indicate data availability for the slave device 802. As shown by reference number 855, the master device 804 may transmit, to the slave device 802 in a Bluetooth monitoring occasion (e.g., the third Bluetooth monitoring occasion shown in FIG. 8B), a Bluetooth transmission that includes an indication to wake up. The slave device 802 may receive, in the Bluetooth monitoring occasion, the Bluetooth transmission that includes the indication to wake up. In some aspects, the Bluetooth transmission may combine the Bluetooth transmission (e.g., the beacon signal or the polling signal) that enables the slave device 802 to remain paired with the master device 804 and/or to synchronize with the master device 804 for Bluetooth communications with the indication to wake up.

Returning to FIG. 8A, as shown by reference number 840, in some aspects, the slave device 802 may activate the cellular modem of the slave device 802 based at least in part on receiving the indication to wake up from the master device 804 via the short-range wireless communication protocol. For example, the slave device 802, based at least in part on receiving the indication to wake up, may activate the cellular modem for a DRX on duration of the CDRX cycle to monitor for downlink communications (e.g., PDCCH and/or PDSCH communications) from the network node 110. As shown by reference number 860 in FIG. 8B, the slave device 802, in connection with receiving the indication to wake up in a Bluetooth monitoring occasion, may wake up (e.g., activate the cellular modem of the slave device 802) for a DXR on duration of the CDRX cycle to receive one or more downlink communications (e.g., PDCCH and/or PDSCH communications) from the network node.

As shown by reference number 845, the slave device 802 may communicate with the network node 110 using the cellular modem of the slave device 802. In some aspects, the slave device 802 may activate the cellular modem and communicate with the network node 110 using the cellular modem, based at least in part on the indication to wake up received from the master device 804 via the short-range wireless communication protocol. For example, the slave device 802 may switch from a DRX sleep mode to an active mode for a DRX on duration in connection with receiving the indication to wake up via the short-range wireless communication protocol. The network node 110 may transmit, and the slave device 802 may receive, one or more downlink communications (e.g., PDCCH and/or PDSCH communications) while in the slave device 802 is in the active mode. Additionally, or alternatively, the slave device 802 may transmit, and the network node 110 may receive, one or more uplink communications while the slave device 802 is in the active mode.

In some aspects, the operations described in connection with FIGS. 8A-8B may be combined with the operations described in connection with FIGS. 6A-6B. For example, the WUS sharing discussed in connection with FIGS. 8A-8B may be performed by master device 804 and the slave device 802 while operating in the connected mode, and the IDRX paging sharing discussed in connection with FIGS. 6A-6B may be performed by the master device 804 and the slave device 802 while operating in the idle or inactive mode. In this case, the master device 804 may perform the operations of the UE 604 discussed in connection with FIGS. 6A-6B, and the slave device 802 may perform the operations of the connected device 602 discussed in connection with FIGS. 6A-6B.

As indicated above, FIGS. 8A-8B are provided as an example. Other examples may differ from what is described with respect to FIGS. 8A-8B.

Figure 9:
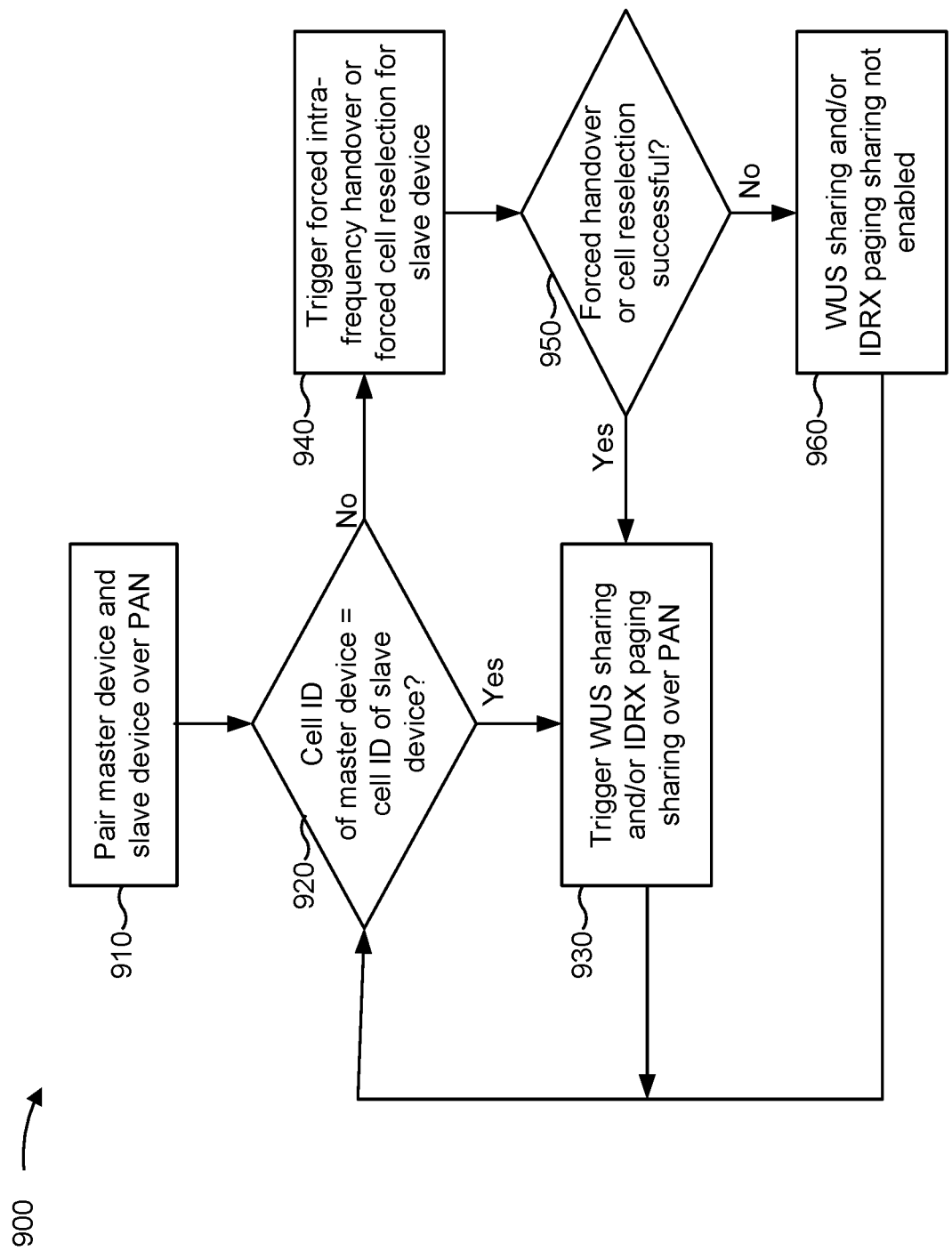
FIG. 9 is a diagram illustrating an example process associated with power saving for connected devices, in accordance with the present disclosure.

FIG. 9 is a diagram illustrating an example process 900 associated with power saving for connected devices, in accordance with the present disclosure. Example process 900 is an example where a master device (e.g., the UE 604 and/or the master device 804) and/or a slave device (e.g., the connected device 602 and/or the slave device 604) perform operations associated with power saving for connected devices.

As shown in FIG. 9, in some aspects, process 900 may include pairing with the master device and the slave device over a PAN (block 910). For example, the master device and the slave device may pair via a short-range wireless communication protocol (e.g., Bluetooth, among other examples).

As further shown in FIG. 9, in some aspects, process 900 may include determining whether the cell ID of the master device is the same as the cell ID of the slave device (block 930). The cell ID of the master device may indicate a cell (e.g., in a PLMN) on which the master device is camped, and the cell ID of the slave device may indicate a cell on which the slave device is camped. In some examples, the master device may receive, from the slave device via the PAN (e.g., via the short-range wireless communication protocol), an indication of the cell ID of the slave device. The master device may compare the cell ID of the slave device with the cell ID of the master device to determine whether the cell ID of the slave device is the same as the cell ID of the master device (e.g., to determine whether the slave device is camped on the same cell as the master device. If the cell ID of the slave device is the same as the cell ID of the master device, process 900 may proceed to block 930. If the cell ID of the slave device is not the same as the cell ID of the master device, process 900 may proceed to block 940.

As further shown in FIG. 9, in some aspects, process 900 may include triggering WUS sharing (e.g., in a connected mode) and/or IDRX paging sharing (e.g., in an idle or inactive mode) over the PAN (block 930). For example, the master device and/or the slave device may trigger WUS sharing in the connected mode (e.g., as described in connection with FIGS. 8A-8B) and/or IDRX paging sharing in the idle or inactive mode (e.g., as described in connection with FIGS. 6A-6B) in connection with the determination (e.g., in block 920) that the cell ID of the slave device is the same as the cell ID of the master device (e.g., in connection with the determination that the slave device is camped on the same cell as the master device).

As further shown in FIG. 9, in some aspects, process 900 may include triggering a forces intra-frequency handover or a forced cell reselection for the slave device (block 940). For example, the master device, in connection with the determination (e.g., in block 920) that the cell ID of the salve device is not the same as the cell ID of the master device (e.g., in connection with the determination that the slave device is camped on a different cell from the master device), may transmit an indication to the slave device via the PAN (e.g., via the short-range wireless communication protocol) to trigger a forced intra-frequency handover or a forced cell reselection for the slave device. In a case in which the slave device is in the connected mode, a forced intra-frequency handover may be triggered to the slave device to switch the slave device to the cell on which the master device is camped. In a case in which the slave device is in the idle mode (or inactive mode), a forced cell reselection may be triggered for the slave device to switch the slave device to the cell on which the master device is camped.

As further shown in FIG. 9, in some aspects, process 900 may include determining whether the forced handover or the forced cell reselection for the slave device is successful (block 950). For example, the master device and/or the slave device may determine whether the forced intra-frequency handover or the forced cell reselection successfully switched the slave device to the cell on which the master device is camped. In some examples, the master device may receive, from the slave device via the PAN, an indication of an updated cell ID for the slave device resulting from the forced intra-frequency handover or the forced cell reselection. The master device may compare the updated cell ID for the slave device to the cell ID for the master device to determine whether the updated cell ID for the slave device is the same as the cell ID for the master device (e.g., the slave device has switched to the cell on which the master device is camped). If the forced handover or the forced cell reselection is successful (e.g., the updated cell ID of the slave device is the same as the cell ID of the master device), process 900 may proceed to block 930, and the WUS sharing and/or IDRX paging sharing may be triggered for the master device and the slave device. If the forced handover or the forced cell reselection is not successful (e.g., the handover or cell reselection is not successful or the update cell ID of the slave device is not the same as the cell ID of the master device), process 900 may proceed to block 960.

As further shown in FIG. 9, in some aspects, process 900 may include refraining from enabling/triggering WUS sharing and/or IDRX paging sharing for the master device and the slave device (block 960). For example, WUS sharing and/or IDRX paging sharing may not be enabled for the master device and the slave device in connection with the determination (e.g., in block 950) that the forced handover or the forced cell reselection is not successful. That is, the master device and/or the slave device may refrain from triggering WUS sharing and/or IDRX paging sharing in connection with the determination (e.g., in block 950) that the forced handover or the forced cell reselection is not successful.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
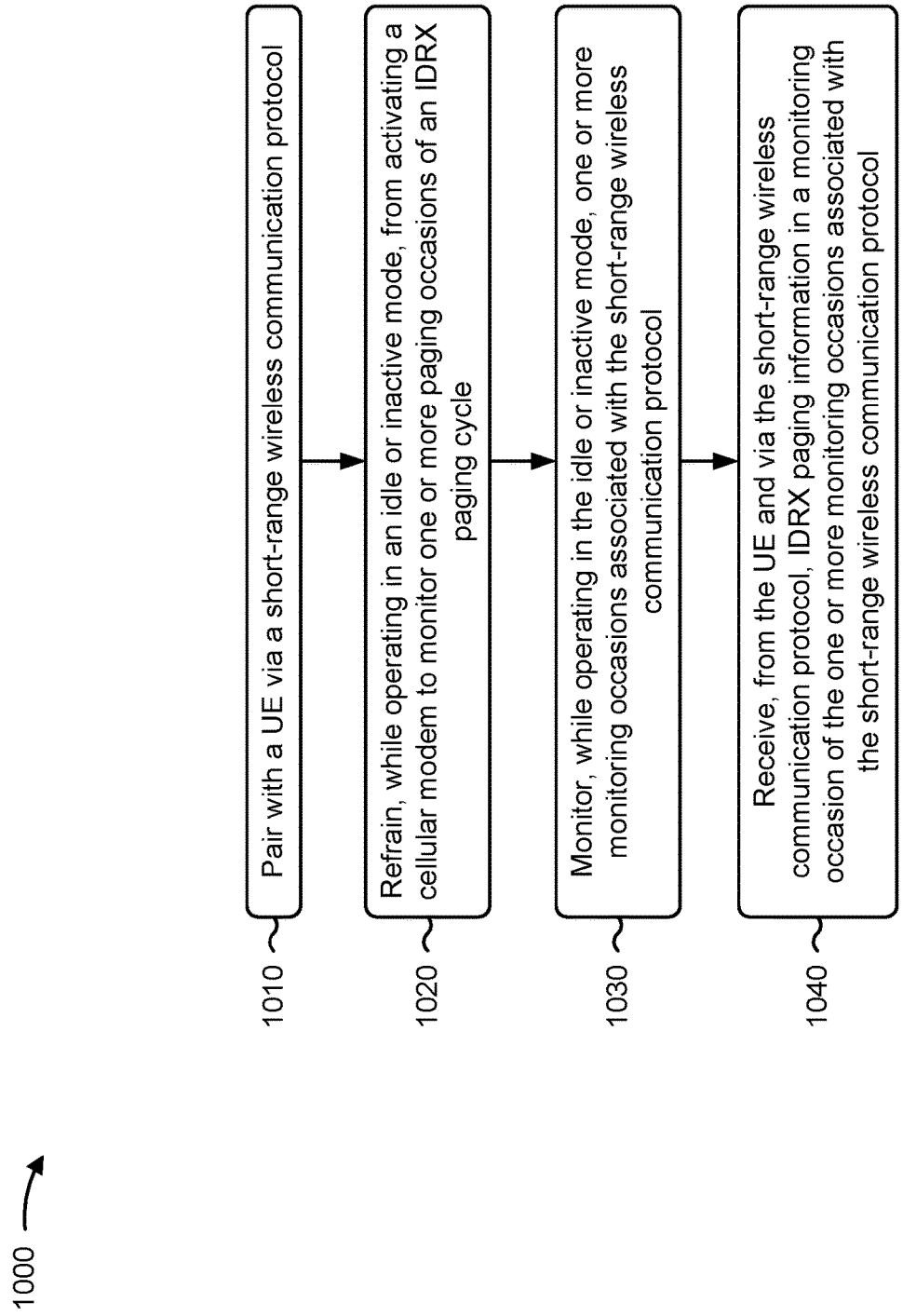
FIG. 10 is a diagram illustrating an example process performed, for example, by a device, in accordance with the present disclosure.

FIG. 10 is a diagram illustrating an example process 1000 performed, for example, by a device, in accordance with the present disclosure. Example process 1000 is an example where the device (e.g., connected device 602, UE 120, slave device 802) performs operations associated with power saving for connected devices.

As shown in FIG. 10, in some aspects, process 1000 may include pairing with a UE via a short-range wireless communication protocol (block 1010). For example, the device (e.g., using communication manager 1206, depicted in FIG. 12) may pair with a UE via a short-range wireless communication protocol, as described above.

As further shown in FIG. 10, in some aspects, process 1000 may include refraining, while operating in an idle or inactive mode, from activating a cellular modem to monitor one or more paging occasions of an IDRX paging cycle (block 1020). For example, the device (e.g., using communication manager 1206, depicted in FIG. 12) may refrain, while operating in an idle or inactive mode, from activating a cellular modem to monitor one or more paging occasions of an IDRX paging cycle, as described above.

As further shown in FIG. 10, in some aspects, process 1000 may include monitoring, while operating in the idle or inactive mode, one or more monitoring occasions associated with the short-range wireless communication protocol (block 1030). For example, the device (e.g., using communication manager 1206, depicted in FIG. 12) may monitor, while operating in the idle or inactive mode, one or more monitoring occasions associated with the short-range wireless communication protocol, as described above.

As further shown in FIG. 10, in some aspects, process 1000 may include receiving, from the UE and via the short-range wireless communication protocol, IDRX paging information in a monitoring occasion of the one or more monitoring occasions associated with the short-range wireless communication protocol (block 1040). For example, the device (e.g., using reception component 1202 and/or communication manager 1206, depicted in FIG. 12) may receive, from the UE and via the short-range wireless communication protocol, IDRX paging information in a monitoring occasion of the one or more monitoring occasions associated with the short-range wireless communication protocol, as described above.

Process 1000 may include additional aspects, such as any single aspect or any combination of aspects described below and/or in connection with one or more other processes described elsewhere herein.

In a first aspect, refraining from activating the cellular modem to monitor the one or more paging occasions of the IDRX paging cycle includes refraining from activating the cellular modem to monitor the one or more paging occasions of the IDRX paging cycle based at least in part on pairing with the UE via the short-range wireless communication protocol.

In a second aspect, alone or in combination with the first aspect, the one or more monitoring occasions associated with the short-range wireless communication protocol have a same periodicity as the one or more paging occasions of the IDRX paging cycle.

In a third aspect, alone or in combination with one or more of the first and second aspects, each monitoring occasion of the one or more monitoring occasions associated with the short-range wireless communication protocol is offset from a respective paging occasion of the one or more paging occasions of the IDRX paging cycle by a time offset.

In a fourth aspect, alone or in combination with one or more of the first through third aspects, the IDRX paging information includes a paging message received by the UE in a paging occasion of the one or more paging occasions of the IDRX paging cycle.

In a fifth aspect, alone or in combination with one or more of the first through fourth aspects, the IDRX paging information indicates that the device is paged in a paging occasion of the one or more paging occasions of the IDRX cycle.

In a sixth aspect, alone or in combination with one or more of the first through fifth aspects, process 1000 includes activating the cellular modem and communicating with a network node using the cellular modem, based at least in part on the IDRX paging information.

In a seventh aspect, alone or in combination with one or more of the first through sixth aspects, the short-range wireless communication protocol is Bluetooth.

In an eighth aspect, alone or in combination with one or more of the first through seventh aspects, the device is a wearable device.

In a ninth aspect, alone or in combination with one or more of the first through eighth aspects, process 1000 includes refraining, while operating in a connected mode, from activating the cellular modem to monitor one or more WUS occasions associated with a CDRX cycle, monitoring while operating in the connected mode, the one or more monitoring occasions associated with the short-range wireless communication protocol, and receiving, from the UE and via the short-range wireless communication protocol, an indication to wake up in a monitoring occasion of the one or more monitoring occasions associated with the short-range wireless communication protocol.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
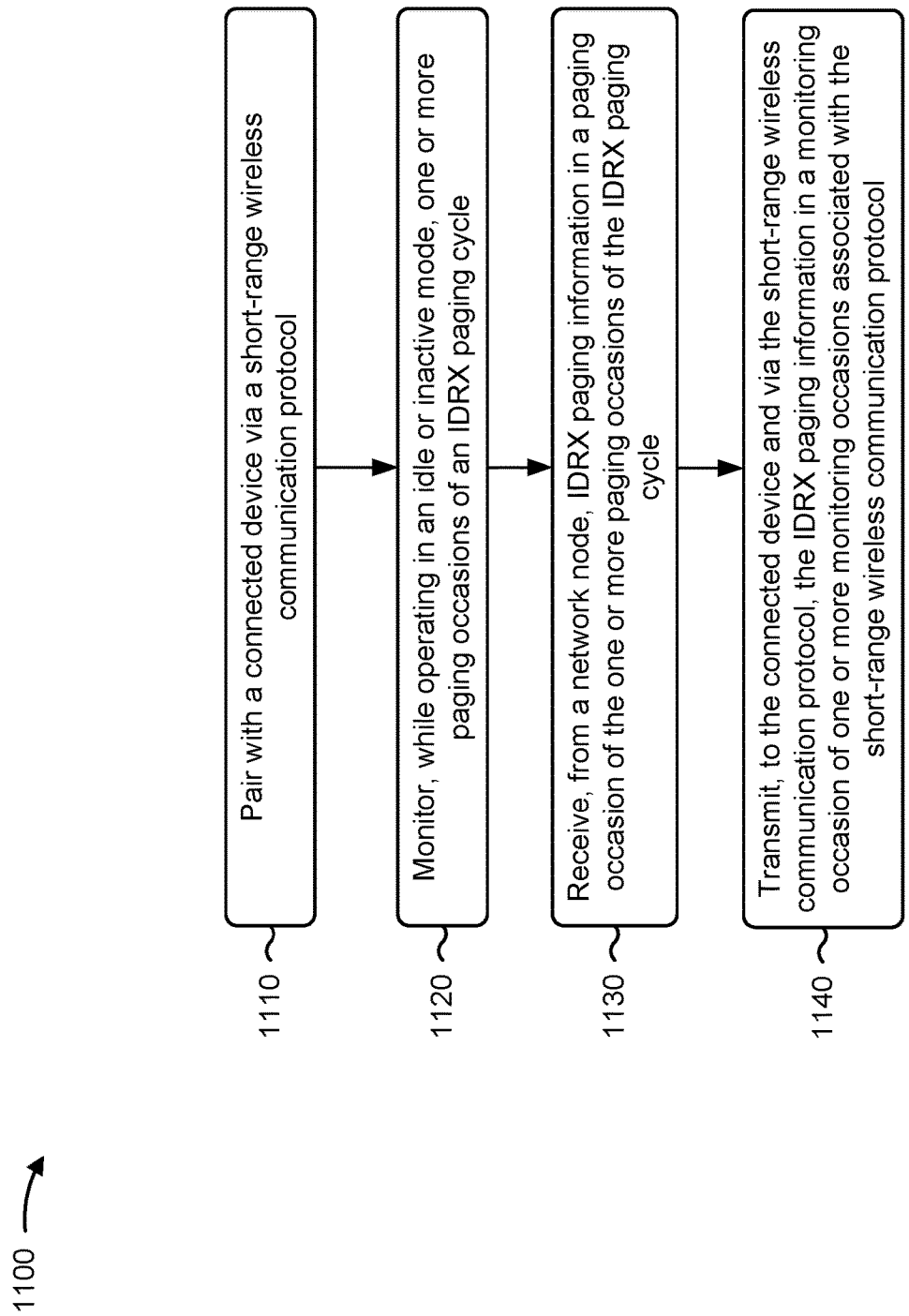
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 604, UE 120, master device 804) performs operations associated with power saving for connected devices.

As shown in FIG. 11, in some aspects, process 1100 may include pairing with a connected device via a short-range wireless communication protocol (block 1110). For example, the UE (e.g., using communication manager 1306, depicted in FIG. 13) may pair with a connected device via a short-range wireless communication protocol, as described above.

As further shown in FIG. 11, in some aspects, process 1100 may include monitoring, while operating in an idle or inactive mode, one or more paging occasions of an IDRX paging cycle (block 1120). For example, the UE (e.g., using communication manager 1306, depicted in FIG. 13) may monitor, while operating in an idle or inactive mode, one or more paging occasions of an IDRX paging cycle, as described above.

As further shown in FIG. 11, in some aspects, process 1100 may include receiving, from a network node, IDRX paging information in a paging occasion of the one or more paging occasions of the IDRX paging cycle (block 1130). For example, the UE (e.g., using reception component 1302 and/or communication manager 1306, depicted in FIG. 13) may receive, from a network node, IDRX paging information in a paging occasion of the one or more paging occasions of the IDRX paging cycle, as described above.

As further shown in FIG. 11, in some aspects, process 1100 may include transmitting, to the connected device and via the short-range wireless communication protocol, the IDRX paging information in a monitoring occasion of one or more monitoring occasions associated with the short-range wireless communication protocol (block 1140). For example, the UE (e.g., using transmission component 1304 and/or communication manager 1306, depicted in FIG. 13) may transmit, to the connected device and via the short-range wireless communication protocol, the IDRX paging information in a monitoring occasion of one or more monitoring occasions associated with the short-range wireless communication protocol, as described above.

Process 1100 may include additional aspects, such as any single aspect or any combination of aspects described below and/or in connection with one or more other processes described elsewhere herein.

In a first aspect, the one or more monitoring occasions associated with the short-range wireless communication protocol have a same periodicity as the one or more paging occasions of the IDRX paging cycle.

In a second aspect, alone or in combination with the first aspect, each monitoring occasion of the one or more monitoring occasions associated with the short-range wireless communication protocol is offset from a respective paging occasion of the one or more paging occasions of the IDRX paging cycle by a time offset.

In a third aspect, alone or in combination with one or more of the first and second aspects, the IDRX paging information includes a paging message received by the UE in a paging occasion of the one or more paging occasions of the IDRX paging cycle.

In a fourth aspect, alone or in combination with one or more of the first through third aspects, the IDRX paging information indicates that the connected device is paged in a paging occasion of the one or more paging occasions of the IDRX cycle.

In a fifth aspect, alone or in combination with one or more of the first through fourth aspects, transmitting the IDRX paging information includes transmitting the IDRX paging information to the connected device via the short-range wireless communication protocol based at least in part on the IDRX paging information indicating that the connected device is paged.

In a sixth aspect, alone or in combination with one or more of the first through fifth aspects, the short-range wireless communication protocol is Bluetooth.

In a seventh aspect, alone or in combination with one or more of the first through sixth aspects, the connected device is a wearable device.

In an eighth aspect, alone combination with one or more of the first through seventh aspects, process 1100 includes monitoring, while operating in a connected mode, one or more WUS occasions associated with a CDRX cycle, receiving, from the network node, a WUS in a WUS occasion of the one or more WUS occasions, and transmitting, to the connected device and via the short-range wireless communication protocol, an indication to wake up in a monitoring occasion of the one or more monitoring occasions associated with the short-range wireless communication protocol.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
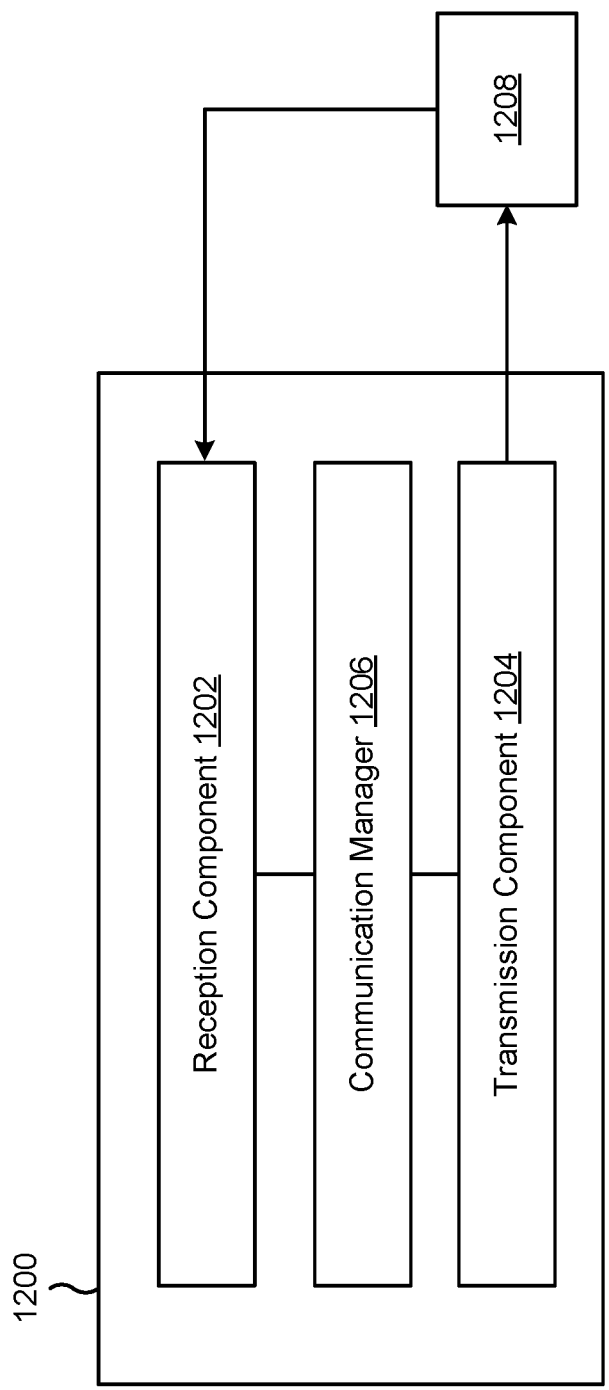
FIGS. 12-13 are diagrams of example apparatuses for wireless communication, in accordance with the present disclosure.

FIG. 12 is a diagram of an example apparatus 1200 for wireless communication, in accordance with the present disclosure. The apparatus 1200 may be a device (e.g., a connected device), or a device (e.g., a connected device) may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 6A-6B, 7, 8A-8B, and 9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the device described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the device described in connection with FIG. 2. Additionally, or alternatively, in some aspects, the reception component 1202 may include a short-range wireless communication receiver (or a short-range wireless communication transceiver), as discussed in connection with FIG. 4.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the device described in connection with FIG. 2. Additionally, or alternatively, in some aspects, the transmission component 1204 may include a short-range wireless communication transmitted (or a short-range wireless communication transceiver), as discussed in connection with FIG. 4. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The communication manager 1206 may pair with a UE via a short-range wireless communication protocol. The communication manager 1206 may refrain, while operating in an idle or inactive mode, from activating a cellular modem to monitor one or more paging occasions of an IDRX paging cycle. The communication manager 1206 may monitor, while operating in the idle or inactive mode, one or more monitoring occasions associated with the short-range wireless communication protocol. The reception component 1202 may receive, from the UE and via the short-range wireless communication protocol, IDRX paging information in a monitoring occasion of the one or more monitoring occasions associated with the short-range wireless communication protocol.

The communication manager 1206 may activate the cellular modem and communicate with a network node using the cellular modem, based at least in part on the IDRX paging information.

The communication manager 1206 may refrain, while operating in a connected mode, from activating the cellular modem to monitor one or more WUS occasions associated with a CDRX cycle. The communication manager 1206 may monitor, while operating in the connected mode, the one or more monitoring occasions associated with the short-range wireless communication protocol. The reception component 1202 may receive, from the UE and via the short-range wireless communication protocol, an indication to wake up in a monitoring occasion of the one or more monitoring occasions associated with the short-range wireless communication protocol.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
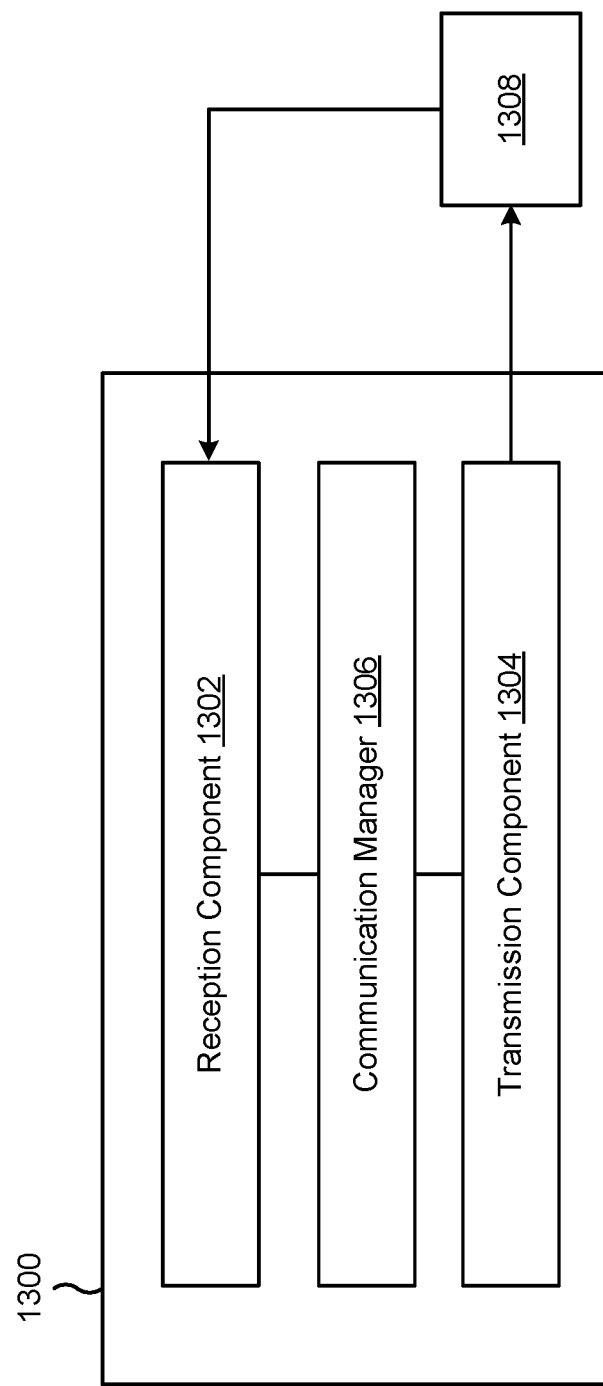

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 6A-6B, 7, 8A-8B, and 9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

Additionally, or alternatively, in some aspects, the reception component 1302 may include a short-range wireless communication receiver (or a short-range wireless communication transceiver), as discussed in connection with FIG. 4.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the UE described in connection with FIG. 2. Additionally, or alternatively, in some aspects, the transmission component 1304 may include a short-range wireless communication transmitter (or a short-range wireless communication transceiver), as discussed in connection with FIG. 4. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The communication manager 1306 may pair with a connected device via a short-range wireless communication protocol. The communication manager 1306 may monitor, while operating in an idle or inactive mode, one or more paging occasions of an IDRX paging cycle. The reception component 1302 may receive, from a network node, IDRX paging information in a paging occasion of the one or more paging occasions of the IDRX paging cycle. The transmission component 1304 may transmit, to the connected device and via the short-range wireless communication protocol, the IDRX paging information in a monitoring occasion of one or more monitoring occasions associated with the short-range wireless communication protocol.

The communication manager 1306 may monitor, while operating in a connected mode, one or more WUS occasions associated with a CDRX cycle. The reception component 1302 may receive, from the network node, a WUS in a WUS occasion of the one or more WUS occasions. The transmission component 1304 may transmit, to the connected device and via the short-range wireless communication protocol, an indication to wake up in a monitoring occasion of the one or more monitoring occasions associated with the short-range wireless communication protocol.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a device, comprising: pairing with a user equipment (UE) via a short-range wireless communication protocol; refraining, while operating in an idle or inactive mode, from activating a cellular modem to monitor one or more paging occasions of an idle mode discontinuous reception (IDRX) paging cycle; monitoring, while operating in the idle or inactive mode, one or more monitoring occasions associated with the short-range wireless communication protocol; and receiving, from the UE and via the short-range wireless communication protocol, IDRX paging information in a monitoring occasion of the one or more monitoring occasions associated with the short-range wireless communication protocol.

Aspect 2: The method of Aspect 1, wherein refraining from activating the cellular modem to monitor the one or more paging occasions of the IDRX paging cycle comprises: refraining from activating the cellular modem to monitor the one or more paging occasions of the IDRX paging cycle based at least in part on pairing with the UE via the short-range wireless communication protocol.

Aspect 3: The method of any of Aspects 1-2, wherein the one or more monitoring occasions associated with the short-range wireless communication protocol have a same periodicity as the one or more paging occasions of the IDRX paging cycle.

Aspect 4: The method of Aspect 3, wherein each monitoring occasion of the one or more monitoring occasions associated with the short-range wireless communication protocol is offset from a respective paging occasion of the one or more paging occasions of the IDRX paging cycle by a time offset.

Aspect 5: The method of any of Aspects 1-4, wherein the IDRX paging information includes a paging message received by the UE in a paging occasion of the one or more paging occasions of the IDRX paging cycle.

Aspect 6: The method of any of Aspects 1-5, wherein the IDRX paging information indicates that the device is paged in a paging occasion of the one or more paging occasions of the IDRX cycle.

Aspect 7: The method of any of Aspects 1-6, further comprising: activating the cellular modem and communicating with a network node using the cellular modem, based at least in part on the IDRX paging information.

Aspect 8: The method of any of Aspects 1-7, wherein the short-range wireless communication protocol is Bluetooth.

Aspect 9: The method of any of Aspects 1-8, wherein the device is a wearable device.

Aspect 10: The method of any of Aspects 1-9, further comprising: refraining, while operating in a connected mode, from activating the cellular modem to monitor one or more wake-up signal (WUS) occasions associated with a connected mode discontinuous reception (CDRX) cycle; monitoring while operating in the connected mode, the one or more monitoring occasions associated with the short-range wireless communication protocol; and receiving, from the UE and via the short-range wireless communication protocol, an indication to wake up in a monitoring occasion of the one or more monitoring occasions associated with the short-range wireless communication protocol.

Aspect 11: A method of wireless communication performed by a user equipment (UE), comprising: pairing with a connected device via a short-range wireless communication protocol; monitoring, while operating in an idle or inactive mode, one or more paging occasions of an idle mode discontinuous reception (IDRX) paging cycle; receiving, from a network node, IDRX paging information in a paging occasion of the one or more paging occasions of the IDRX paging cycle; and transmitting, to the connected device and via the short-range wireless communication protocol, the IDRX paging information in a monitoring occasion of one or more monitoring occasions associated with the short-range wireless communication protocol.

Aspect 12: The method of Aspect 11, wherein the one or more monitoring occasions associated with the short-range wireless communication protocol have a same periodicity as the one or more paging occasions of the IDRX paging cycle.

Aspect 13: The method of Aspect 12, wherein each monitoring occasion of the one or more monitoring occasions associated with the short-range wireless communication protocol is offset from a respective paging occasion of the one or more paging occasions of the IDRX paging cycle by a time offset.

Aspect 14: The method of any of Aspects 11-13, wherein the IDRX paging information includes a paging message received by the UE in a paging occasion of the one or more paging occasions of the IDRX paging cycle.

Aspect 15: The method of any of Aspects 11-14, wherein the IDRX paging information indicates that the connected device is paged in a paging occasion of the one or more paging occasions of the IDRX cycle.

Aspect 16: The method of any of Aspects 11-15, wherein transmitting the IDRX paging information comprises: transmitting the IDRX paging information to the connected device via the short-range wireless communication protocol based at least in part on the IDRX paging information indicating that the connected device is paged.

Aspect 17: The method of any of Aspects 11-16, wherein the short-range wireless communication protocol is Bluetooth.

Aspect 18: The method of any of Aspects 11-17, wherein the connected device is a wearable device.

Aspect 19: The method of any of Aspects 11-18, further comprising: monitoring, while operating in a connected mode, one or more wake-up signal (WUS) occasions associated with a connected mode discontinuous reception (CDRX) cycle; receiving, from the network node, a WUS in a WUS occasion of the one or more WUS occasions; and transmitting, to the connected device and via the short-range wireless communication protocol, an indication to wake up in a monitoring occasion of the one or more monitoring occasions associated with the short-range wireless communication protocol.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising a memory and one or more processors coupled to the memory, the one or more processors configured to perform the method of one or more of Aspects 1-19.

Aspect 22: An apparatus for wireless communication, comprising at least one means for performing the method of one or more of Aspects 1-19.

Aspect 23: A non-transitory computer-readable medium storing code for wireless communication, the code comprising instructions executable by a processor to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device for wireless communication, comprising:
a memory; and
one or more processors, coupled to the memory, configured to:
pair with a user equipment (UE) via a short-range wireless communication protocol;
receive an indication from the UE to perform a forced cell reselection based at least on a determination that the device is not camped on a same cell as the UE;
perform a forced cell reselection to camp on the same cell as the UE based at least on receiving the indication;
refrain, while operating in an idle or inactive mode, from activating a cellular modem to monitor one or more paging occasions of an idle mode discontinuous reception (IDRX) paging cycle;
monitor, while operating in the idle or inactive mode, one or more monitoring occasions associated with the short-range wireless communication protocol; and
receive, from the UE and via the short-range wireless communication protocol, IDRX paging information in a monitoring occasion of the one or more monitoring occasions associated with the short-range wireless communication protocol.

2. The device of claim 1,
wherein the one or more processors, to refrain from activating the cellular modem to monitor the one or more paging occasions of the IDRX paging cycle, are configured to:
refrain from activating the cellular modem to monitor the one or more paging occasions of the IDRX paging cycle based at least in part on pairing with the UE via the short-range wireless communication protocol.

3. The device of claim 1,
wherein the one or more monitoring occasions associated with the short-range wireless communication protocol have a same periodicity as the one or more paging occasions of the IDRX paging cycle.

4. The device of claim 3,
wherein each monitoring occasion of the one or more monitoring occasions associated with the short-range wireless communication protocol is offset from a respective paging occasion of the one or more paging occasions of the IDRX paging cycle by a time offset.

5. The device of claim 1,
wherein the IDRX paging information includes a paging message received by the UE in a paging occasion of the one or more paging occasions of the IDRX paging cycle.

6. The device of claim 1,
wherein the IDRX paging information indicates that the device is paged in a paging occasion of the one or more paging occasions of the IDRX cycle.

7. The device of claim 1,
wherein the one or more processors are further configured to:
activate the cellular modem and communicating with a network node using the cellular modem, based at least in part on the IDRX paging information.

8. The device of claim 1,
wherein the short-range wireless communication protocol is Bluetooth.

9. The device of claim 1,
wherein the device is a wearable device.

10. The device of claim 1,
wherein the one or more processors are further configured to:
refrain, while operating in a connected mode, from activating the cellular modem to monitor one or more wake-up signal (WUS) occasions associated with a connected mode discontinuous reception (CDRX) cycle;
monitor, while operating in the connected mode, the one or more monitoring occasions associated with the short-range wireless communication protocol; and
receive, from the UE and via the short-range wireless communication protocol, an indication to wake up in a monitoring occasion of the one or more monitoring occasions associated with the short-range wireless communication protocol.

11. A user equipment (UE) for wireless communication, comprising:
a memory; and
one or more processors, coupled to the memory, configured to:
pair with a connected device via a short-range wireless communication protocol;
transmit an indication to the connected device to perform a forced cell reselection based at least on a determination that the connected device is not camped on a same cell as the UE;
monitor, while operating in an idle or inactive mode, one or more paging occasions of an idle mode discontinuous reception (IDRX) paging cycle;
receive, from a network node, IDRX paging information in a paging occasion of the one or more paging occasions of the IDRX paging cycle; and
transmit, to the connected device and via the short-range wireless communication protocol, the IDRX paging information in a monitoring occasion of one or more monitoring occasions associated with the short-range wireless communication protocol.

12. The UE of claim 11,
wherein the one or more monitoring occasions associated with the short-range wireless communication protocol have a same periodicity as the one or more paging occasions of the IDRX paging cycle.

13. The UE of claim 12,
wherein each monitoring occasion of the one or more monitoring occasions associated with the short-range wireless communication protocol is offset from a respective paging occasion of the one or more paging occasions of the IDRX paging cycle by a time offset.

14. The UE of claim 11,
wherein the IDRX paging information includes a paging message received by the UE in a paging occasion of the one or more paging occasions of the IDRX paging cycle.

15. The UE of claim 11,
wherein the IDRX paging information indicates that the connected device is paged in a paging occasion of the one or more paging occasions of the IDRX cycle.

16. The UE of claim 11,
wherein the one or more processors, to transmit the IDRX paging information, are configured to:
  transmit the IDRX paging information to the connected device via the short-range wireless communication protocol based at least in part on the IDRX paging information indicating that the connected device is paged.

17. The UE of claim 11,
wherein the short-range wireless communication protocol is Bluetooth.

18. The UE of claim 11,
wherein the connected device is a wearable device.

19. The UE of claim 11,
wherein the one or more processors are further configured to:
  monitor, while operating in a connected mode, one or more wake-up signal (WUS) occasions associated with a connected mode discontinuous reception (CDRX) cycle;
  receive, from the network node, a WUS in a WUS occasion of the one or more WUS occasions; and
  transmit, to the connected device and via the short-range wireless communication protocol, an indication to wake up in a monitoring occasion of the one or more monitoring occasions associated with the short-range wireless communication protocol.

20. A method of wireless communication performed by a device, comprising:
  pairing with a user equipment (UE) via a short-range wireless communication protocol;
  receiving an indication from the UE to perform a forced cell reselection based at least on a determination that the device is not camped on a same cell as the UE;
  performing a forced cell reselection to camp on the same cell as the UE based at least on receiving the indication;
  refraining, while operating in an idle or inactive mode, from activating a cellular modem to monitor one or more paging occasions of an idle mode discontinuous reception (IDRX) paging cycle;
  monitoring, while operating in the idle or inactive mode, one or more monitoring occasions associated with the short-range wireless communication protocol; and
  receiving, from the UE and via the short-range wireless communication protocol, IDRX paging information in a monitoring occasion of the one or more monitoring occasions associated with the short-range wireless communication protocol.

21. The method of claim 20,
wherein refraining from activating the cellular modem to monitor the one or more paging occasions of the IDRX paging cycle comprises:
  refraining from activating the cellular modem to monitor the one or more paging occasions of the IDRX paging cycle based at least in part on pairing with the UE via the short-range wireless communication protocol.

22. The method of claim 20,
wherein the one or more monitoring occasions associated with the short-range wireless communication protocol have a same periodicity as the one or more paging occasions of the IDRX paging cycle.

23. The method of claim 22,
wherein each monitoring occasion of the one or more monitoring occasions associated with the short-range wireless communication protocol is offset from a respective paging occasion of the one or more paging occasions of the IDRX paging cycle by a time offset.

24. The method of claim 20,
wherein the IDRX paging information includes a paging message received by the UE in a paging occasion of the one or more paging occasions of the IDRX paging cycle.

25. The method of claim 20,
wherein the IDRX paging information indicates that the device is paged in a paging occasion of the one or more paging occasions of the IDRX cycle.

26. The method of claim 20, further comprising:
  activating the cellular modem and communicating with a network node using the cellular modem, based at least in part on the IDRX paging information.

27. A method of wireless communication performed by a user equipment (UE), comprising:
  pairing with a connected device via a short-range wireless communication protocol;
  transmitting an indication to the connected device to perform a forced cell reselection based at least on a determination that the connected device is not camped on a same cell as the UE;
  monitoring, while operating in an idle or inactive mode, one or more paging occasions of an idle mode discontinuous reception (IDRX) paging cycle;
  receiving, from a network node, IDRX paging information in a paging occasion of the one or more paging occasions of the IDRX paging cycle; and
  transmitting, to the connected device and via the short-range wireless communication protocol, the IDRX paging information in a monitoring occasion of one or more monitoring occasions associated with the short-range wireless communication protocol.

28. The method of claim 27,
wherein the one or more monitoring occasions associated with the short-range wireless communication protocol have a same periodicity as the one or more paging occasions of the IDRX paging cycle.

29. The method of claim 27,
wherein the IDRX paging information indicates that the connected device is paged in a paging occasion of the one or more paging occasions of the IDRX cycle.

30. The method of claim 27,
wherein transmitting the IDRX paging information comprises:
  transmitting the IDRX paging information to the connected device via the short-range wireless communication protocol based at least in part on the IDRX paging information indicating that the connected device is paged.

* * * * *